(12) United States Patent
Gupta

(10) Patent No.: US 10,096,022 B2
(45) Date of Patent: Oct. 9, 2018

(54) DYNAMIC WIDGET GENERATOR APPARATUSES, METHODS AND SYSTEMS

(71) Applicant: Visa International Service Association, San Francisco, CA (US)

(72) Inventor: Manav Gupta, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1132 days.

(21) Appl. No.: 13/714,090

(22) Filed: Dec. 13, 2012

(65) Prior Publication Data

US 2013/0151417 A1    Jun. 13, 2013

Related U.S. Application Data

(60) Provisional application No. 61/639,843, filed on Apr. 27, 2012, provisional application No. 61/570,230, filed on Dec. 13, 2011.

(51) Int. Cl.
 G06Q 20/38 (2012.01)
 G06Q 20/12 (2012.01)
 G06Q 30/06 (2012.01)

(52) U.S. Cl.
 CPC .......... *G06Q 20/382* (2013.01); *G06Q 20/12* (2013.01); *G06Q 20/385* (2013.01); *G06Q 30/0601* (2013.01)

(58) Field of Classification Search
 None
 See application file for complete search history.

(56) References Cited

U.S. PATENT DOCUMENTS

| 789,106 A | 5/1905 | Seymour |
| 5,237,164 A | 8/1993 | Takada |
| 5,311,594 A | 5/1994 | Penzias |

(Continued)

FOREIGN PATENT DOCUMENTS

| EP | 0855659 | 11/2007 |
| JP | 08-545210 | 12/2008 |
| KR | 10-0432430 | 5/2004 |
| KR | 06-0117177 | 11/2006 |
| KR | 07-0104087 | 10/2007 |

(Continued)

OTHER PUBLICATIONS

Jones, Peter, "SAP Business Information Warehouse Reporting: Building Better BI with SAP BI 7.0," Jan. 18, 2008, McGraw-Hill Osborne Media, Sections 3.1, 13.1, 15.2.

(Continued)

*Primary Examiner* — Mamon Obeid
(74) *Attorney, Agent, or Firm* — Loeb & Loeb LLP

(57) ABSTRACT

The DYNAMIC WIDGET GENERATOR APPARATUSES, METHODS AND SYSTEMS ("DWG") transforms developer credentials, codes and parameter inputs via DWG components into buy widgets, payment acceptance and purchase transaction outputs. In one embodiment, the DWG may facilitate obtaining a plurality of authentication parameters and widget customization parameters. The DWG may authenticate a user using a parameter derived from the plurality of authentication parameters and may dynamically generating a purchase widget for the authenticated user using the plurality of widget customization parameters.

54 Claims, 17 Drawing Sheets

(56) References Cited

U.S. PATENT DOCUMENTS

| | | | |
|---|---|---|---|
| 5,446,890 A | 8/1995 | Renslo et al. | |
| 5,459,656 A | 10/1995 | Fields et al. | |
| 5,510,777 A | 4/1996 | Pile et al. | |
| 5,521,362 A | 5/1996 | Powers | |
| 5,530,438 A | 6/1996 | Bickham et al. | |
| 5,536,045 A | 7/1996 | Adams | |
| 5,588,105 A * | 12/1996 | Foster | G06F 3/0481 715/779 |
| 5,615,110 A | 3/1997 | Wong | |
| 5,615,264 A | 3/1997 | Kazmierczak et al. | |
| 5,649,118 A | 7/1997 | Carlisle et al. | |
| 5,815,657 A | 9/1998 | Williams et al. | |
| 5,850,446 A | 12/1998 | Berger et al. | |
| 5,878,337 A | 3/1999 | Joao et al. | |
| 5,903,830 A | 5/1999 | Joao et al. | |
| 5,943,624 A | 8/1999 | Fox et al. | |
| 5,963,924 A | 10/1999 | Williams et al. | |
| 6,061,660 A * | 5/2000 | Eggleston | G06Q 30/02 705/14.12 |
| 6,064,990 A | 5/2000 | Goldsmith | |
| 6,092,053 A | 7/2000 | Boesch et al. | |
| 6,202,052 B1 | 3/2001 | Miller | |
| 6,202,933 B1 | 3/2001 | Poore et al. | |
| 6,263,447 B1 | 7/2001 | French et al. | |
| 6,267,292 B1 | 7/2001 | Walker et al. | |
| 6,304,886 B1 * | 10/2001 | Bernardo | G06F 17/211 707/E17.112 |
| 6,330,593 B1 * | 12/2001 | Roberts | G06F 17/3005 707/E17.009 |
| 6,336,099 B1 | 1/2002 | Barnett et al. | |
| 6,374,250 B2 * | 4/2002 | Ajtai | H03M 7/30 |
| 6,473,500 B1 | 10/2002 | Risafi et al. | |
| 6,529,725 B1 | 3/2003 | Joao et al. | |
| 6,535,855 B1 | 3/2003 | Cahill et al. | |
| 6,601,761 B1 | 8/2003 | Katis | |
| 6,643,652 B2 | 11/2003 | Helgeson | |
| 6,735,572 B2 | 5/2004 | Landesmann | |
| 6,799,165 B1 * | 9/2004 | Boesjes | G06Q 10/087 705/1.1 |
| 6,842,741 B1 * | 1/2005 | Fujimura | G06Q 20/342 705/1.1 |
| 6,853,386 B1 | 2/2005 | Keim | |
| 6,853,982 B2 | 2/2005 | Smith et al. | |
| 6,857,073 B2 | 2/2005 | French et al. | |
| 6,873,974 B1 | 3/2005 | Schutzer | |
| 6,898,598 B2 | 5/2005 | Himmel et al. | |
| 6,915,279 B2 | 7/2005 | Hogan | |
| 6,934,528 B2 | 8/2005 | Loureiro et al. | |
| 6,963,859 B2 * | 11/2005 | Stefik | G06F 21/10 375/E7.009 |
| 6,999,943 B1 | 2/2006 | Johnson et al. | |
| 7,024,383 B1 | 4/2006 | Mancini et al. | |
| 7,028,052 B2 | 4/2006 | Chapman et al. | |
| 7,047,041 B2 | 5/2006 | Vanska et al. | |
| 7,051,002 B2 | 5/2006 | Keresman, III et al. | |
| 7,089,208 B1 | 8/2006 | Levchin et al. | |
| 7,096,003 B2 | 8/2006 | Joao et al. | |
| 7,111,789 B2 | 9/2006 | Rajasekaran et al. | |
| 7,155,411 B1 | 12/2006 | Blinn et al. | |
| 7,165,041 B1 * | 1/2007 | Guheen | G06Q 30/04 705/26.1 |
| 7,167,844 B1 * | 1/2007 | Leong | G06Q 30/04 705/37 |
| 7,177,848 B2 | 2/2007 | Hogan et al. | |
| 7,194,437 B1 | 3/2007 | Britto et al. | |
| 7,206,847 B1 | 4/2007 | Alberth et al. | |
| 7,212,979 B1 | 5/2007 | Matz et al. | |
| RE39,736 E | 7/2007 | Morrill | |
| 7,268,667 B2 | 9/2007 | Beenau et al. | |
| 7,268,668 B2 | 9/2007 | Beenau et al. | |
| 7,290,704 B1 | 11/2007 | Ball et al. | |
| 7,318,049 B2 | 1/2008 | Iannacci | |
| 7,337,119 B1 | 2/2008 | Geschwender et al. | |
| 7,337,144 B1 | 2/2008 | Blinn et al. | |
| 7,343,149 B2 | 3/2008 | Benco et al. | |
| 7,343,351 B1 | 3/2008 | Bishop et al. | |
| 7,349,885 B2 | 3/2008 | Gangi | |
| 7,356,505 B2 | 4/2008 | March | |
| 7,357,310 B2 | 4/2008 | Calabrese et al. | |
| 7,359,880 B2 | 4/2008 | Abel et al. | |
| 7,373,669 B2 | 5/2008 | Eisen et al. | |
| 7,379,899 B1 | 5/2008 | Junger | |
| 7,392,222 B1 | 6/2008 | Hamilton et al. | |
| 7,395,242 B2 | 7/2008 | Blinn et al. | |
| 7,398,250 B2 | 7/2008 | Blinn et al. | |
| 7,413,113 B1 | 8/2008 | Zhu | |
| 7,450,966 B2 | 11/2008 | Vanska et al. | |
| 7,477,780 B2 | 1/2009 | Boncyk et al. | |
| 7,499,889 B2 | 3/2009 | Golan et al. | |
| 7,500,607 B2 | 3/2009 | Williams | |
| 7,533,064 B1 | 5/2009 | Boesch | |
| 7,536,360 B2 | 5/2009 | Salvotore et al. | |
| 7,571,139 B1 | 8/2009 | Giordano et al. | |
| 7,571,140 B2 | 8/2009 | Weichert et al. | |
| 7,593,858 B2 | 9/2009 | Matz et al. | |
| 7,603,311 B1 | 10/2009 | Yadav-ranjan | |
| 7,630,937 B1 | 12/2009 | Mo et al. | |
| 7,634,295 B2 | 12/2009 | Hayaashi et al. | |
| 7,644,037 B1 | 1/2010 | Ostrovsky | |
| 7,644,859 B1 | 1/2010 | Zhu | |
| 7,645,194 B2 | 1/2010 | Van Luchene | |
| 7,660,749 B2 | 2/2010 | Koski | |
| 7,676,434 B2 | 3/2010 | Evans | |
| 7,685,067 B1 | 3/2010 | Britto et al. | |
| 7,698,221 B2 | 4/2010 | Blinn et al. | |
| 7,707,113 B1 | 4/2010 | Dimartino et al. | |
| 7,708,194 B2 | 5/2010 | Vawter | |
| 7,708,198 B2 | 5/2010 | Gangi | |
| 7,712,658 B2 | 5/2010 | Gangi | |
| 7,716,141 B2 | 5/2010 | Stewart | |
| 7,734,630 B2 * | 6/2010 | Kato | G06F 17/30029 707/748 |
| 7,739,194 B2 | 6/2010 | Blinn et al. | |
| 7,742,984 B2 | 6/2010 | Mohsenzadeh | |
| 7,765,166 B2 | 7/2010 | Beringer | |
| 7,774,076 B2 | 8/2010 | Skowronek | |
| 7,779,360 B1 | 8/2010 | Jones | |
| 7,783,569 B2 | 8/2010 | Abel et al. | |
| 7,784,684 B2 | 8/2010 | Labrou et al. | |
| 7,801,829 B2 | 9/2010 | Gray et al. | |
| 7,802,719 B2 | 9/2010 | Johnson et al. | |
| 7,810,720 B2 | 10/2010 | Lovett | |
| 7,819,307 B2 | 10/2010 | Lyons et al. | |
| 7,828,206 B2 | 11/2010 | Hessburg et al. | |
| 7,828,992 B2 | 11/2010 | Kilickiran et al. | |
| 7,837,125 B2 | 11/2010 | Biskupski | |
| 7,844,530 B2 | 11/2010 | Ziade et al. | |
| 7,849,014 B2 | 12/2010 | Erikson | |
| 7,870,027 B1 | 1/2011 | Tannenbaum | |
| 7,877,299 B2 | 1/2011 | Bui | |
| 7,878,400 B2 | 2/2011 | Harris | |
| 7,890,370 B2 | 2/2011 | Whitsitt et al. | |
| 7,890,393 B2 | 2/2011 | Talbert | |
| 7,895,119 B2 | 2/2011 | Praisner | |
| 7,899,744 B2 | 3/2011 | Bishop et al. | |
| 7,904,360 B2 | 3/2011 | Evans | |
| 7,908,227 B2 | 3/2011 | Zizzimopoulos et al. | |
| 7,926,714 B1 | 4/2011 | Zhu | |
| 7,933,779 B2 | 4/2011 | Rooks et al. | |
| 7,942,337 B2 | 5/2011 | Jain | |
| 7,962,418 B1 | 6/2011 | Wei et al. | |
| 7,967,196 B1 | 6/2011 | Bierbaum et al. | |
| 7,971,782 B1 | 7/2011 | Shams | |
| 7,996,259 B1 | 8/2011 | Distefano, III | |
| 8,016,192 B2 | 9/2011 | Messerges et al. | |
| 8,020,763 B1 | 9/2011 | Kowalchyk et al. | |
| 8,024,260 B1 | 9/2011 | Hogl et al. | |
| 8,028,041 B2 | 9/2011 | Olliphant et al. | |
| 8,032,438 B1 | 10/2011 | Barton et al. | |
| 8,041,338 B2 | 10/2011 | Chen et al. | |
| 8,050,997 B1 | 11/2011 | Nosek et al. | |
| 8,060,413 B2 | 11/2011 | Castell et al. | |
| 8,074,876 B2 | 12/2011 | Foss et al. | |

(56) References Cited

U.S. PATENT DOCUMENTS

| | | | |
|---|---|---|---|
| 8,086,535 B2 * | 12/2011 | Zweig | G06F 21/10 380/200 |
| 8,090,618 B1 | 1/2012 | Chu | |
| 8,108,261 B2 | 1/2012 | Carlier et al. | |
| 8,127,982 B1 | 3/2012 | Casey et al. | |
| 8,140,418 B1 | 3/2012 | Casey et al. | |
| 8,145,188 B2 | 3/2012 | Park et al. | |
| 8,145,561 B1 | 3/2012 | Zhu et al. | |
| 8,145,566 B1 | 3/2012 | Ahuja et al. | |
| 8,145,569 B2 | 3/2012 | Gong | |
| 8,145,898 B2 | 3/2012 | Kamalakantha | |
| 8,150,767 B2 | 4/2012 | Wankmueller | |
| 8,150,772 B2 | 4/2012 | Mardikar et al. | |
| 8,151,328 B1 | 4/2012 | Lundy | |
| 8,151,330 B2 | 4/2012 | Vishik et al. | |
| 8,151,336 B2 | 4/2012 | Savoor | |
| 8,155,999 B2 | 4/2012 | De Boer et al. | |
| 8,156,000 B1 | 4/2012 | Thompson | |
| 8,156,026 B2 | 4/2012 | Junger et al. | |
| 8,156,042 B2 | 4/2012 | Winkleman, III et al. | |
| 8,156,549 B2 | 4/2012 | Rice et al. | |
| 8,157,178 B2 | 4/2012 | Dewan et al. | |
| 8,157,181 B2 | 4/2012 | Bates et al. | |
| 8,160,935 B2 | 4/2012 | Bui | |
| 8,160,959 B2 | 4/2012 | Rackley, III et al. | |
| 8,165,961 B1 | 4/2012 | Dimartino et al. | |
| 8,166,068 B2 | 4/2012 | Stevens | |
| RE43,351 E | 5/2012 | Jordan | |
| 8,170,921 B2 | 5/2012 | Stocker | |
| 8,175,235 B2 | 5/2012 | Mumford et al. | |
| 8,175,965 B2 | 5/2012 | Moore et al. | |
| 8,175,967 B2 | 5/2012 | O'Leary et al. | |
| 8,175,968 B2 | 5/2012 | O'Leary et al. | |
| 8,175,975 B2 | 5/2012 | Cai et al. | |
| 8,175,979 B2 | 5/2012 | Baentsch et al. | |
| 8,176,416 B1 | 5/2012 | Williams et al. | |
| 8,179,563 B2 | 5/2012 | King et al. | |
| 8,180,289 B1 | 5/2012 | Glickman | |
| 8,180,705 B2 | 5/2012 | Kowalchyk et al. | |
| 8,185,439 B2 | 5/2012 | Webb | |
| 8,190,513 B2 | 5/2012 | Felger | |
| 8,191,775 B2 | 6/2012 | Hildred | |
| 8,195,233 B2 | 6/2012 | Morikuni et al. | |
| 8,195,544 B2 | 6/2012 | Horsfall | |
| 8,195,547 B2 | 6/2012 | Aaltonen et al. | |
| 8,195,565 B2 | 6/2012 | Bishop et al. | |
| 8,195,576 B1 | 6/2012 | Grigg et al. | |
| 8,196,131 B1 | 6/2012 | Von Behren et al. | |
| 8,200,582 B1 | 6/2012 | Zhu | |
| 8,204,774 B2 | 6/2012 | Chwast et al. | |
| 8,204,829 B2 | 6/2012 | Alvarez et al. | |
| 8,209,217 B1 | 6/2012 | Griffith | |
| 8,209,245 B2 | 6/2012 | Dennes | |
| 8,209,744 B2 | 6/2012 | Zhu et al. | |
| 8,214,288 B2 | 7/2012 | Olliphant et al. | |
| 8,214,289 B2 | 7/2012 | Scipioni | |
| 8,214,291 B2 | 7/2012 | Pelegero et al. | |
| 8,214,292 B2 | 7/2012 | Duggal et al. | |
| 8,214,293 B2 | 7/2012 | Powell | |
| 8,214,886 B2 | 7/2012 | Foley et al. | |
| 8,215,546 B2 | 7/2012 | Lin et al. | |
| 8,219,411 B2 | 7/2012 | Matz et al. | |
| 8,219,474 B2 | 7/2012 | Sutton et al. | |
| 8,219,490 B2 | 7/2012 | Hammad et al. | |
| 8,220,047 B1 | 7/2012 | Soghoian et al. | |
| 8,224,702 B2 | 7/2012 | Mangerink et al. | |
| 8,224,754 B2 | 7/2012 | Pastusiak et al. | |
| 8,224,773 B2 | 7/2012 | Spiegel | |
| 8,225,997 B1 | 7/2012 | Bierbaum et al. | |
| 8,227,936 B1 | 7/2012 | Folk et al. | |
| 8,229,354 B2 | 7/2012 | Sklovsky et al. | |
| 8,229,808 B1 | 7/2012 | Heit | |
| 8,229,844 B2 | 7/2012 | Felger | |
| 8,229,851 B2 | 7/2012 | Doran et al. | |
| 8,229,854 B2 | 7/2012 | Stephen et al. | |
| 8,233,841 B2 | 7/2012 | Griffin et al. | |
| 8,234,183 B2 | 7/2012 | Smith | |
| 8,239,276 B2 | 8/2012 | Lin et al. | |
| 8,244,580 B2 | 8/2012 | Mankoff et al. | |
| 8,249,965 B2 | 8/2012 | Tumminaro | |
| 8,255,278 B1 | 8/2012 | Young et al. | |
| 8,255,323 B1 | 8/2012 | Casey et al. | |
| 8,255,324 B2 | 8/2012 | Bercy et al. | |
| 8,275,704 B2 | 9/2012 | Bishop et al. | |
| 8,280,777 B2 | 10/2012 | Mengerink et al. | |
| 8,281,998 B2 | 10/2012 | Tang et al. | |
| 8,282,002 B2 | 10/2012 | Shams | |
| 8,285,640 B2 | 10/2012 | Scipioni | |
| 8,285,820 B2 | 10/2012 | Olliphant et al. | |
| 8,285,832 B2 | 10/2012 | Schwab et al. | |
| 8,286,875 B2 | 10/2012 | Tang et al. | |
| 8,290,433 B2 | 10/2012 | Fisher et al. | |
| 8,290,819 B2 | 10/2012 | Bawcutt | |
| 8,290,829 B1 | 10/2012 | Katz et al. | |
| 8,295,898 B2 | 10/2012 | Ashfield et al. | |
| 8,296,187 B2 | 10/2012 | Light et al. | |
| 8,296,204 B2 | 10/2012 | Templeton et al. | |
| 8,296,228 B1 | 10/2012 | Kloor | |
| 8,296,231 B2 | 10/2012 | Britto et al. | |
| 8,301,500 B2 | 10/2012 | Pharris | |
| 8,301,510 B2 | 10/2012 | Boesch | |
| 8,301,556 B2 | 10/2012 | Hogl et al. | |
| 8,311,520 B2 | 11/2012 | Choi et al. | |
| 8,312,096 B2 | 11/2012 | Cohen et al. | |
| 8,321,267 B2 | 11/2012 | Hoerenz et al. | |
| 8,321,294 B2 | 11/2012 | Carlier et al. | |
| 8,321,315 B2 | 11/2012 | Abel et al. | |
| 8,321,338 B2 | 11/2012 | Baumgart et al. | |
| 8,321,343 B2 | 11/2012 | Ramavarjula et al. | |
| 8,326,756 B2 | 12/2012 | Egendorf | |
| 8,326,769 B1 | 12/2012 | Weisman | |
| 8,326,770 B1 | 12/2012 | Weisman | |
| 8,327,450 B2 | 12/2012 | Clement et al. | |
| 8,332,272 B2 | 12/2012 | Fisher | |
| 8,332,275 B2 | 12/2012 | Poon et al. | |
| 8,332,323 B2 | 12/2012 | Stals et al. | |
| 8,335,720 B2 | 12/2012 | Juang et al. | |
| 8,335,726 B1 | 12/2012 | Ling et al. | |
| 8,335,822 B2 | 12/2012 | Ahmed et al. | |
| 8,335,921 B2 | 12/2012 | Von Behren et al. | |
| 8,335,932 B2 | 12/2012 | Von Behren et al. | |
| 8,340,666 B2 | 12/2012 | Ramer et al. | |
| 8,341,029 B1 | 12/2012 | Ramalingam et al. | |
| 8,346,643 B2 | 1/2013 | Boyer et al. | |
| 8,346,659 B1 | 1/2013 | Mohsenzadeh | |
| 8,346,663 B2 | 1/2013 | Kawan | |
| 8,352,323 B2 | 1/2013 | Fisher | |
| 8,352,362 B2 | 1/2013 | Mohsenzadeh | |
| 8,352,499 B2 | 1/2013 | Bharat et al. | |
| 8,352,749 B2 | 1/2013 | Von Behren et al. | |
| 8,355,987 B2 | 1/2013 | Hirson et al. | |
| 8,359,070 B1 | 1/2013 | Zhu | |
| 8,364,587 B2 | 1/2013 | Nuzum et al. | |
| 8,364,590 B1 | 1/2013 | Casey et al. | |
| 8,370,264 B1 | 2/2013 | Wei et al. | |
| 8,380,177 B2 | 2/2013 | Laracey | |
| 8,401,904 B1 | 3/2013 | Simakov et al. | |
| 8,412,586 B1 | 4/2013 | Foulser et al. | |
| 8,412,630 B2 | 4/2013 | Ross et al. | |
| 8,417,633 B1 | 4/2013 | Chmara et al. | |
| 8,423,462 B1 | 4/2013 | Amacker et al. | |
| 8,504,559 B1 | 8/2013 | Elman | |
| 8,606,649 B2 | 12/2013 | Keener, Jr. | |
| 8,639,685 B2 | 1/2014 | Huang | |
| 8,788,935 B1 * | 7/2014 | Hirsch | G06F 17/2247 715/234 |
| 9,355,393 B2 * | 5/2016 | Purves | G06Q 20/105 |
| 9,430,579 B2 * | 8/2016 | Hsu | G06F 17/3089 |
| 9,471,332 B2 * | 10/2016 | Li | G06F 9/451 |
| 9,582,598 B2 * | 2/2017 | Kalgi | G06Q 20/227 |
| 9,622,142 B2 * | 4/2017 | Burton | H04W 76/10 |
| 9,710,807 B2 * | 7/2017 | Theurer | G06Q 20/36 |
| 9,760,871 B1 * | 9/2017 | Pourfallah | G06Q 20/10 |
| 9,940,610 B1 * | 4/2018 | Davison | G06Q 20/12 |

(56) References Cited

U.S. PATENT DOCUMENTS

| | | |
|---|---|---|
| 2001/0037297 A1 | 3/2001 | McNair |
| 2001/0044774 A1 | 11/2001 | Sasazawa |
| 2001/0056359 A1 | 12/2001 | Abreu |
| 2002/0016765 A1 | 2/2002 | Sacks |
| 2002/0019777 A1* | 2/2002 | Schwab ............. G06Q 10/0837 705/26.41 |
| 2002/0040325 A1 | 4/2002 | Takae et al. |
| 2002/0077976 A1 | 6/2002 | Meyer et al. |
| 2002/0082919 A1 | 6/2002 | Laundau |
| 2002/0107755 A1 | 8/2002 | Steed et al. |
| 2002/0112014 A1 | 8/2002 | Bennett et al. |
| 2002/0116271 A1 | 8/2002 | Mankoff |
| 2002/0120859 A1 | 8/2002 | Lipkin |
| 2002/0143614 A1 | 10/2002 | MacLean et al. |
| 2003/0014307 A1 | 1/2003 | Heng |
| 2003/0014331 A1 | 1/2003 | Simons |
| 2003/0020748 A1* | 1/2003 | Charpentier ............... G06F 3/14 715/744 |
| 2003/0026404 A1 | 2/2003 | Joyce et al. |
| 2003/0028481 A1 | 2/2003 | Flitcroft et al. |
| 2003/0061170 A1* | 3/2003 | Uzo ........................ G06Q 20/06 705/64 |
| 2003/0061482 A1* | 3/2003 | Emmerichs ........... G06F 21/604 713/165 |
| 2003/0080185 A1 | 5/2003 | Werther |
| 2003/0097318 A1 | 5/2003 | Yu et al. |
| 2003/0101134 A1 | 5/2003 | Liu et al. |
| 2003/0135734 A1* | 7/2003 | Fagan ...................... G06F 21/41 713/169 |
| 2003/0135842 A1* | 7/2003 | Frey .......................... G06F 8/71 717/121 |
| 2003/0158811 A1 | 8/2003 | Sanders |
| 2003/0174823 A1 | 9/2003 | Justice et al. |
| 2003/0177361 A1* | 9/2003 | Wheeler ................. G06F 21/32 713/176 |
| 2003/0191711 A1 | 10/2003 | Jamison et al. |
| 2003/0200142 A1 | 10/2003 | Hicks et al. |
| 2003/0200184 A1 | 10/2003 | Dominguez et al. |
| 2003/0212642 A1 | 11/2003 | Weller et al. |
| 2003/0233286 A1 | 12/2003 | Hahn-Carlson |
| 2004/0054625 A1 | 3/2004 | Kellogg |
| 2004/0059659 A1 | 3/2004 | Safaei |
| 2004/0078332 A1 | 4/2004 | Ferguson et al. |
| 2004/0103037 A1 | 5/2004 | Wetmore |
| 2004/0117358 A1 | 6/2004 | von Kaenel |
| 2004/0128197 A1 | 7/2004 | Bam et al. |
| 2004/0138999 A1 | 7/2004 | Friedman et al. |
| 2004/0148255 A1 | 7/2004 | Beck et al. |
| 2004/0215963 A1 | 10/2004 | Kaplan |
| 2004/0230536 A1 | 11/2004 | Fung et al. |
| 2004/0236646 A1 | 11/2004 | Wu et al. |
| 2004/0254836 A1* | 12/2004 | Emoke Barabas .... G06Q 30/02 705/14.35 |
| 2004/0254891 A1 | 12/2004 | Blinn et al. |
| 2004/0267608 A1 | 12/2004 | Mansfield, Jr. |
| 2005/0010483 A1 | 1/2005 | Ling |
| 2005/0015338 A1* | 1/2005 | Lee ....................... G06Q 20/102 705/40 |
| 2005/0037735 A1 | 2/2005 | Coutts |
| 2005/0065819 A1 | 3/2005 | Schultz |
| 2005/0080747 A1 | 4/2005 | Anderson et al. |
| 2005/0080821 A1 | 4/2005 | Breil et al. |
| 2005/0097320 A1 | 5/2005 | Golan et al. |
| 2005/0137969 A1 | 6/2005 | Shah |
| 2005/0171894 A1 | 8/2005 | Traynor |
| 2005/0177464 A1 | 8/2005 | Komem |
| 2005/0192893 A1 | 9/2005 | Keeling et al. |
| 2005/0192895 A1 | 9/2005 | Rogers et al. |
| 2005/0220326 A1 | 10/2005 | Sim |
| 2005/0234817 A1 | 10/2005 | VanFleet et al. |
| 2005/0246278 A1 | 11/2005 | Gerber et al. |
| 2005/0253840 A1 | 11/2005 | Kwon |
| 2005/0254714 A1 | 11/2005 | Anne |
| 2005/0261967 A1 | 11/2005 | Barry et al. |
| 2006/0004713 A1 | 1/2006 | Korte |
| 2006/0005207 A1* | 1/2006 | Louch ...................... G06F 8/38 719/328 |
| 2006/0015399 A1* | 1/2006 | Alberth, Jr. .......... G06Q 10/103 705/301 |
| 2006/0053056 A1 | 3/2006 | Alspach-goss et al. |
| 2006/0053077 A1* | 3/2006 | Mourad .............. G06F 17/3089 705/51 |
| 2006/0085328 A1 | 4/2006 | Cohen et al. |
| 2006/0085477 A1 | 4/2006 | Phillips et al. |
| 2006/0089962 A1* | 4/2006 | Tsukazaki ............. G06Q 30/06 709/200 |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano et al. |
| 2006/0190347 A1 | 8/2006 | Cuervo |
| 2006/0212722 A1* | 9/2006 | Ginter ..................... G06F 21/10 713/193 |
| 2006/0218153 A1 | 9/2006 | Voon |
| 2006/0226216 A1 | 10/2006 | Keithley |
| 2006/0268007 A1* | 11/2006 | Gopalakrishnan ........................ G06F 17/30244 345/619 |
| 2006/0277143 A1 | 12/2006 | Almonte et al. |
| 2006/0293947 A1 | 12/2006 | Nicholson |
| 2007/0011025 A1 | 1/2007 | Cracchiolo et al. |
| 2007/0038515 A1 | 2/2007 | Postrel |
| 2007/0038516 A1 | 2/2007 | Apple et al. |
| 2007/0055571 A1 | 3/2007 | Fox et al. |
| 2007/0060315 A1 | 3/2007 | Park |
| 2007/0061250 A1 | 3/2007 | Kuo |
| 2007/0087820 A1 | 4/2007 | Van Luchene et al. |
| 2007/0087822 A1 | 4/2007 | Van Luchene |
| 2007/0094066 A1 | 4/2007 | Kumar et al. |
| 2007/0100691 A1 | 5/2007 | Patterson |
| 2007/0100728 A1 | 5/2007 | Rotman et al. |
| 2007/0101276 A1 | 5/2007 | Yuen |
| 2007/0106607 A1 | 5/2007 | Seib et al. |
| 2007/0113289 A1 | 5/2007 | Blumenau |
| 2007/0143204 A1 | 6/2007 | Claus et al. |
| 2007/0150413 A1 | 6/2007 | Morgenstern |
| 2007/0180119 A1 | 8/2007 | Khivesara et al. |
| 2007/0189579 A1 | 8/2007 | Crookham |
| 2007/0208662 A1 | 9/2007 | Jeronimus et al. |
| 2007/0214078 A1 | 9/2007 | Coppinger |
| 2007/0214250 A1 | 9/2007 | Ahmed et al. |
| 2007/0226152 A1 | 9/2007 | Jones |
| 2007/0233590 A1 | 10/2007 | Hardison, III |
| 2007/0239502 A1 | 10/2007 | Babu |
| 2007/0239552 A1 | 10/2007 | Sundaresan |
| 2007/0255653 A1* | 11/2007 | Tumminaro ........... G06Q 20/10 705/39 |
| 2007/0267479 A1 | 11/2007 | Nix |
| 2007/0276765 A1 | 11/2007 | Hazel et al. |
| 2007/0299976 A1* | 12/2007 | Zafar ................... H04L 61/1582 709/229 |
| 2008/0004116 A1 | 1/2008 | Van Luchene et al. |
| 2008/0004952 A1 | 1/2008 | Koli |
| 2008/0010096 A1 | 1/2008 | Patterson et al. |
| 2008/0021829 A1 | 1/2008 | Kranzley |
| 2008/0034309 A1* | 2/2008 | Louch ...................... G06F 3/0481 715/766 |
| 2008/0077489 A1 | 3/2008 | Gilley et al. |
| 2008/0086365 A1 | 4/2008 | Zollino et al. |
| 2008/0091553 A1 | 4/2008 | Koski |
| 2008/0091616 A1 | 4/2008 | Helwin et al. |
| 2008/0097856 A1 | 4/2008 | Blagg et al. |
| 2008/0097871 A1* | 4/2008 | Williams ................ G06Q 20/10 705/500 |
| 2008/0104496 A1* | 5/2008 | Williams ............. G06Q 10/107 715/209 |
| 2008/0114737 A1 | 5/2008 | Neely et al. |
| 2008/0120194 A1 | 5/2008 | Juras |
| 2008/0126145 A1 | 5/2008 | Racklet, III et al. |
| 2008/0133351 A1 | 6/2008 | White et al. |
| 2008/0140568 A1 | 6/2008 | Henry |
| 2008/0147480 A1 | 6/2008 | Sarma |

(56) References Cited

U.S. PATENT DOCUMENTS

| | | |
|---|---|---|
| 2008/0147883 A1 | 6/2008 | Philyaw |
| 2008/0148283 A1* | 6/2008 | Allen .................. G06F 8/38 719/316 |
| 2008/0154915 A1 | 6/2008 | Flake |
| 2008/0162361 A1 | 7/2008 | Sklovsky et al. |
| 2008/0167965 A1 | 7/2008 | Von Nothaus et al. |
| 2008/0172274 A1 | 7/2008 | Hurowitz et al. |
| 2008/0172331 A1 | 7/2008 | Graves et al. |
| 2008/0177574 A1 | 7/2008 | Lara Gonzalez et al. |
| 2008/0177672 A1 | 7/2008 | Brunner et al. |
| 2008/0181463 A1 | 7/2008 | Error |
| 2008/0195510 A1 | 8/2008 | Olliphant |
| 2008/0195664 A1 | 8/2008 | Maharajh |
| 2008/0208704 A1 | 8/2008 | Wang |
| 2008/0208712 A1 | 8/2008 | Yerkes |
| 2008/0222170 A1 | 9/2008 | Farnham |
| 2008/0223918 A1 | 9/2008 | Williams et al. |
| 2008/0235123 A1* | 9/2008 | Olliphant .............. G06Q 20/12 705/35 |
| 2008/0244509 A1* | 10/2008 | Buchs .................. G06F 8/36 717/106 |
| 2008/0263460 A1* | 10/2008 | Altberg ................ G06Q 30/02 715/757 |
| 2008/0270300 A1 | 10/2008 | Jones et al. |
| 2008/0272188 A1 | 11/2008 | Keithley et al. |
| 2008/0319905 A1 | 12/2008 | Carlson |
| 2009/0006181 A1 | 1/2009 | Ghosh et al. |
| 2009/0024452 A1 | 1/2009 | Martinez |
| 2009/0024527 A1 | 1/2009 | Sellen et al. |
| 2009/0031228 A1* | 1/2009 | Buchs ................ G06F 17/30893 715/764 |
| 2009/0037255 A1 | 2/2009 | Chiu et al. |
| 2009/0048934 A1 | 2/2009 | Haddad et al. |
| 2009/0055757 A1* | 2/2009 | Chaney .................. G06F 9/451 715/762 |
| 2009/0061884 A1 | 3/2009 | Rajan et al. |
| 2009/0063261 A1 | 3/2009 | Scribner et al. |
| 2009/0064056 A1 | 3/2009 | Anderson et al. |
| 2009/0076934 A1* | 3/2009 | Shahbazi .............. G06Q 20/102 705/30 |
| 2009/0076953 A1 | 3/2009 | Saville et al. |
| 2009/0076966 A1 | 3/2009 | Bishop et al. |
| 2009/0089176 A1 | 4/2009 | Mccabe |
| 2009/0089193 A1 | 4/2009 | Paintin |
| 2009/0099925 A1 | 4/2009 | Mehta |
| 2009/0099961 A1 | 4/2009 | Ogilvy |
| 2009/0104888 A1 | 4/2009 | Cox |
| 2009/0106151 A1 | 4/2009 | Nelsen et al. |
| 2009/0119176 A1 | 5/2009 | Johnson |
| 2009/0119211 A1 | 5/2009 | Johnson |
| 2009/0132347 A1 | 5/2009 | Anderson et al. |
| 2009/0132395 A1 | 5/2009 | Lam et al. |
| 2009/0132403 A1* | 5/2009 | Titus .................. G06Q 10/04 705/311 |
| 2009/0132435 A1* | 5/2009 | Titus .................. G06Q 10/10 705/400 |
| 2009/0138525 A1 | 5/2009 | Mattox |
| 2009/0144104 A1 | 6/2009 | Johnson |
| 2009/0150388 A1* | 6/2009 | Roseman .............. G06F 17/278 |
| 2009/0164315 A1* | 6/2009 | Rothman .............. G06Q 30/02 705/14.52 |
| 2009/0164344 A1 | 6/2009 | Shiftan et al. |
| 2009/0171760 A1* | 7/2009 | Aarnio .................. G06Q 30/02 705/14.66 |
| 2009/0171778 A1 | 7/2009 | Powell |
| 2009/0182664 A1 | 7/2009 | Trombley |
| 2009/0182762 A1* | 7/2009 | Chang .................. G06F 17/30935 |
| 2009/0182837 A1 | 7/2009 | Roberts |
| 2009/0210300 A1 | 8/2009 | Cansler et al. |
| 2009/0222302 A1 | 9/2009 | Higgins |
| 2009/0222347 A1 | 9/2009 | Whitten |
| 2009/0222511 A1* | 9/2009 | Hays .................. G06F 17/2229 709/203 |
| 2009/0233579 A1 | 9/2009 | Castell et al. |
| 2009/0234751 A1 | 9/2009 | Chan et al. |
| 2009/0241159 A1 | 9/2009 | Campagna et al. |
| 2009/0248996 A1 | 10/2009 | Mandyam |
| 2009/0254471 A1 | 10/2009 | Seidel et al. |
| 2009/0254479 A1 | 10/2009 | Pharris |
| 2009/0254535 A1 | 10/2009 | Eickelmann et al. |
| 2009/0265274 A1 | 10/2009 | Hahn-Carlson et al. |
| 2009/0271265 A1 | 10/2009 | Lay et al. |
| 2009/0271283 A1* | 10/2009 | Fosnacht .............. G06Q 20/123 705/26.1 |
| 2009/0288012 A1 | 11/2009 | Hertel et al. |
| 2009/0307135 A1 | 12/2009 | Gupta et al. |
| 2009/0313132 A1 | 12/2009 | McKenna et al. |
| 2009/0327040 A1 | 12/2009 | McInerny |
| 2009/0327045 A1 | 12/2009 | Olives et al. |
| 2009/0327088 A1 | 12/2009 | Puthupparambil et al. |
| 2010/0004989 A1 | 1/2010 | Bonalle et al. |
| 2010/0005025 A1 | 1/2010 | Kumar |
| 2010/0009663 A1 | 1/2010 | Chang |
| 2010/0010964 A1 | 1/2010 | Skowronek et al. |
| 2010/0017501 A1* | 1/2010 | Yen .................. G06F 21/10 709/219 |
| 2010/0023386 A1 | 1/2010 | Avisar et al. |
| 2010/0023455 A1 | 1/2010 | Dispensa et al. |
| 2010/0036741 A1 | 2/2010 | Cleven |
| 2010/0036775 A1 | 2/2010 | Edens |
| 2010/0042456 A1 | 2/2010 | Stinchcombe et al. |
| 2010/0042537 A1 | 2/2010 | Smith et al. |
| 2010/0042540 A1 | 2/2010 | Graves et al. |
| 2010/0049879 A1 | 2/2010 | Leavitt et al. |
| 2010/0063873 A1 | 3/2010 | McGucken |
| 2010/0063903 A1 | 3/2010 | Whipple et al. |
| 2010/0076873 A1 | 3/2010 | Taylor et al. |
| 2010/0076987 A1 | 3/2010 | Schreiner |
| 2010/0078471 A1 | 4/2010 | Lin et al. |
| 2010/0078472 A1 | 4/2010 | Lin et al. |
| 2010/0082444 A1 | 4/2010 | Lin et al. |
| 2010/0082445 A1 | 4/2010 | Hodge et al. |
| 2010/0082447 A1 | 4/2010 | Lin et al. |
| 2010/0082455 A1 | 4/2010 | Rosenblatt et al. |
| 2010/0082480 A1 | 4/2010 | Korosec |
| 2010/0082481 A1 | 4/2010 | Lin et al. |
| 2010/0082485 A1 | 4/2010 | Lin et al. |
| 2010/0082490 A1 | 4/2010 | Rosenblatt et al. |
| 2010/0082491 A1 | 4/2010 | Rosenblatt et al. |
| 2010/0088188 A1 | 4/2010 | Kumar et al. |
| 2010/0094730 A1 | 4/2010 | Koski |
| 2010/0100480 A1 | 4/2010 | Altman et al. |
| 2010/0121707 A1 | 5/2010 | Goeldi |
| 2010/0125492 A1 | 5/2010 | Lin et al. |
| 2010/0125495 A1 | 5/2010 | Smith et al. |
| 2010/0125803 A1 | 5/2010 | Johnson |
| 2010/0130853 A1* | 5/2010 | Chandonnet .............. A61B 5/06 600/424 |
| 2010/0131347 A1 | 5/2010 | Sarptipi |
| 2010/0131415 A1 | 5/2010 | Sartipi |
| 2010/0131569 A1 | 5/2010 | Lawyer |
| 2010/0131589 A1 | 5/2010 | Lawyer |
| 2010/0155470 A1 | 6/2010 | Woronec |
| 2010/0161433 A1 | 6/2010 | White |
| 2010/0174599 A1 | 7/2010 | Rosenblatt et al. |
| 2010/0185505 A1 | 7/2010 | Sprogoe et al. |
| 2010/0185531 A1 | 7/2010 | Van Luchene |
| 2010/0191578 A1 | 7/2010 | Tran et al. |
| 2010/0191622 A1 | 7/2010 | Reiss et al. |
| 2010/0191770 A1 | 7/2010 | Cho et al. |
| 2010/0198626 A1 | 8/2010 | Cho et al. |
| 2010/0211445 A1 | 8/2010 | Bodington |
| 2010/0211452 A1 | 8/2010 | D'Angelo et al. |
| 2010/0211499 A1 | 8/2010 | Zanzot et al. |
| 2010/0211863 A1 | 8/2010 | Jones |
| 2010/0216542 A1 | 8/2010 | Van Luchene |
| 2010/0217682 A1 | 8/2010 | Chan |
| 2010/0218128 A1 | 8/2010 | Bonat |
| 2010/0223119 A1 | 9/2010 | Klish |
| 2010/0227675 A1 | 9/2010 | Luxton |
| 2010/0241499 A1 | 9/2010 | Crispo |
| 2010/0241507 A1 | 9/2010 | Quinn |
| 2010/0250351 A1 | 9/2010 | Gillenson et al. |

(56) References Cited

U.S. PATENT DOCUMENTS

| | | |
|---|---|---|
| 2010/0268648 A1 | 10/2010 | Wiesman |
| 2010/0276484 A1 | 11/2010 | Banerjee et al. |
| 2010/0303230 A1 | 12/2010 | Taveau |
| 2010/0305848 A1 | 12/2010 | Stallman |
| 2010/0306075 A1 | 12/2010 | Drance et al. |
| 2010/0306113 A1 | 12/2010 | Grey et al. |
| 2010/0312645 A1 | 12/2010 | Niekadlik et al. |
| 2010/0312676 A1 | 12/2010 | Muthukumaran |
| 2010/0332262 A1 | 12/2010 | Horvitz et al. |
| 2010/0332283 A1 | 12/2010 | Ng et al. |
| 2011/0020129 A1 | 1/2011 | Petri Larrea |
| 2011/0022482 A1 | 1/2011 | Florek |
| 2011/0035594 A1 | 2/2011 | Fox |
| 2011/0047075 A1 | 2/2011 | Fourez |
| 2011/0059784 A1 | 3/2011 | Lutnick |
| 2011/0060663 A1* | 3/2011 | McPhie ............ G06Q 30/02 705/27.1 |
| 2011/0071843 A1 | 3/2011 | Gilvar |
| 2011/0078082 A1 | 3/2011 | Gupta |
| 2011/0082789 A1 | 4/2011 | Boyd |
| 2011/0085667 A1* | 4/2011 | Berrios ............ G06F 21/445 380/282 |
| 2011/0087534 A1 | 4/2011 | Strebinger |
| 2011/0099057 A1 | 4/2011 | Tenyer |
| 2011/0105183 A1 | 5/2011 | Hsiao et al. |
| 2011/0106698 A1 | 5/2011 | Issacson et al. |
| 2011/0137742 A1 | 6/2011 | Parikh |
| 2011/0161882 A1* | 6/2011 | Dasgupta ........... H04N 21/4821 715/830 |
| 2011/0178896 A1 | 7/2011 | Nakajima et al. |
| 2011/0184827 A1 | 7/2011 | Hubert |
| 2011/0191210 A1* | 8/2011 | Blackhurst ......... G06Q 20/12 705/27.1 |
| 2011/0196724 A1 | 8/2011 | Fenton |
| 2011/0201299 A1 | 8/2011 | Kamdar |
| 2011/0202406 A1 | 8/2011 | Suomela |
| 2011/0208629 A1* | 8/2011 | Benefield ............ G06Q 40/00 705/35 |
| 2011/0209049 A1* | 8/2011 | Ghosh ............... G06Q 10/06 715/236 |
| 2011/0212762 A1 | 9/2011 | Ocko |
| 2011/0215146 A1 | 9/2011 | Shams |
| 2011/0218846 A1 | 9/2011 | Fieldman |
| 2011/0218849 A1 | 9/2011 | Rutigliano |
| 2011/0218870 A1 | 9/2011 | Shams et al. |
| 2011/0246290 A1 | 10/2011 | Howard et al. |
| 2011/0258031 A1 | 10/2011 | Valin |
| 2011/0258123 A1 | 10/2011 | Dawkins et al. |
| 2011/0276507 A1 | 11/2011 | OMalley |
| 2011/0296508 A1 | 12/2011 | Os et al. |
| 2011/0320250 A1 | 12/2011 | Gemmell |
| 2011/0320344 A1 | 12/2011 | Faith et al. |
| 2012/0005030 A1 | 1/2012 | Valin |
| 2012/0011063 A1 | 1/2012 | Killian et al. |
| 2012/0020973 A1* | 1/2012 | Crowe ............ A61K 39/0225 424/139.1 |
| 2012/0022943 A1 | 1/2012 | Howard et al. |
| 2012/0022981 A1 | 1/2012 | Morgenstern |
| 2012/0023026 A1 | 1/2012 | Chen et al. |
| 2012/0030101 A1 | 2/2012 | Boyd |
| 2012/0036071 A1 | 2/2012 | Fulton et al. |
| 2012/0054049 A1 | 3/2012 | Hayes |
| 2012/0078735 A1* | 3/2012 | Bauer ............... G06Q 20/20 705/16 |
| 2012/0084135 A1 | 4/2012 | Nissan |
| 2012/0084204 A1 | 4/2012 | Castell et al. |
| 2012/0089446 A1 | 4/2012 | Gupta |
| 2012/0095895 A1 | 4/2012 | Aston |
| 2012/0101881 A1 | 4/2012 | Taylor et al. |
| 2012/0116966 A1 | 5/2012 | Tan |
| 2012/0118950 A1 | 5/2012 | Belk |
| 2012/0123838 A1 | 5/2012 | Sparks |
| 2012/0130853 A1 | 5/2012 | Petri |
| 2012/0136780 A1 | 5/2012 | El-Awady et al. |
| 2012/0150598 A1 | 6/2012 | Griggs |
| 2012/0158580 A1* | 6/2012 | Eram ............... G06Q 20/10 705/39 |
| 2012/0158584 A1* | 6/2012 | Behren ............ G06Q 20/10 705/41 |
| 2012/0166333 A1 | 6/2012 | von Behren et al. |
| 2012/0173431 A1 | 7/2012 | Ritchie et al. |
| 2012/0190386 A1 | 7/2012 | Anderson |
| 2012/0197756 A1 | 8/2012 | Stacker |
| 2012/0209677 A1* | 8/2012 | Mehta ............ G06Q 20/12 705/14.16 |
| 2012/0215640 A1 | 8/2012 | Ramer et al. |
| 2012/0215650 A1 | 8/2012 | Oba et al. |
| 2012/0215701 A1* | 8/2012 | Mehta ............ G06Q 20/12 705/75 |
| 2012/0221421 A1 | 8/2012 | Hammad |
| 2012/0221502 A1 | 8/2012 | Jerram et al. |
| 2012/0231844 A1 | 9/2012 | Coppinger |
| 2012/0259763 A1 | 10/2012 | Pessin |
| 2012/0304273 A1 | 11/2012 | Bailey et al. |
| 2012/0310826 A1 | 12/2012 | Chatterjee |
| 2012/0323664 A1 | 12/2012 | Klems |
| 2013/0030922 A1* | 1/2013 | Shalabi ............ G06Q 30/0241 705/14.66 |
| 2013/0041811 A1 | 2/2013 | Vazquez |
| 2013/0090750 A1 | 4/2013 | Herrman et al. |
| 2013/0095910 A1 | 4/2013 | Chu |
| 2013/0151417 A1* | 6/2013 | Gupta ............... G06Q 20/382 705/65 |
| 2013/0185135 A1 | 7/2013 | Mason |
| 2013/0246943 A1* | 9/2013 | Goodman ......... H04L 67/02 715/760 |
| 2013/0268763 A1* | 10/2013 | Sweet ............... H04L 63/0428 713/176 |
| 2013/0290203 A1* | 10/2013 | Purves ............ G06Q 50/01 705/319 |
| 2013/0304637 A1 | 11/2013 | McCabe |
| 2013/0346302 A1* | 12/2013 | Purves ............ G06Q 20/102 705/40 |
| 2014/0052617 A1* | 2/2014 | Chawla ............ G06Q 20/12 705/39 |
| 2014/0172472 A1* | 6/2014 | Florimond ........ G06Q 10/02 705/5 |
| 2014/0207662 A1 | 7/2014 | Isaacson |
| 2014/0282371 A1* | 9/2014 | Hirsch ............. G06F 8/36 717/106 |
| 2014/0351048 A1 | 11/2014 | Fordyce |
| 2015/0221316 A1* | 8/2015 | Mufti ............... G10L 19/018 700/94 |
| 2015/0262168 A1* | 9/2015 | Armstrong ........ G06Q 20/065 705/39 |
| 2015/0347989 A1* | 12/2015 | Kumar S ......... G06Q 20/027 705/44 |
| 2016/0117780 A1* | 4/2016 | Semlani ............ G06Q 20/123 705/30 |
| 2016/0232515 A1* | 8/2016 | Jhas ............... G06Q 30/02 |
| 2016/0328693 A1* | 11/2016 | Mao ............... G06Q 20/0855 |
| 2017/0185989 A1* | 6/2017 | Bozovich, Jr. ........ G06Q 20/29 |
| 2017/0193475 A1* | 7/2017 | Mercille ............ G06Q 20/123 |
| 2017/0193490 A1* | 7/2017 | Mercille ............ G06Q 20/325 |
| 2017/0221062 A1* | 8/2017 | Katz ............... G06Q 20/4014 |
| 2017/0228711 A1* | 8/2017 | Chawla ............ G06Q 20/12 |
| 2017/0278085 A1* | 9/2017 | Anderson ........... G06Q 20/227 |
| 2018/0096321 A1* | 4/2018 | Haldenby ........... G06Q 20/102 |

FOREIGN PATENT DOCUMENTS

| | | |
|---|---|---|
| WO | WO01/065502 | 9/2001 |
| WO | WO03023674 | 4/2004 |
| WO | WO10/148737 | 12/2010 |

OTHER PUBLICATIONS

Wikipedia, modified Aug. 26, 2010, "Social Graph"; http://web.archive.Org/web/20100914055833/http://en.wikipedia.org/wiki/Social_Graph, Accessed Aug. 29, 2013. 3 pages.

(56) References Cited

OTHER PUBLICATIONS

PCT International Preliminary Report on Patentability dated Mar. 6, 2012 corresponding to application PCT/US2010/046833. 6 pages.
International Preliminary Report on Patentability for PCT/US2010/033229 dated Dec. 29, 2010. (8 pages).
Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, p. 1.
David Breitkopf, "ACS to Take Over Mich. WC Distribution Program", American Banker, New York, NY: Jul. 20, 2006, vol. 171, Issue 138, p. 6.
Gopalan, NP & Selvan, B Siva. TCP/IP Illustrated. Prentice-Hall. 2008. pp. 101-102, 175-176 and 235.
International Preliminary Report on Patentability for PCT/US2010/033229.
International Search Report and Written Opinion for PCT/US11/57173 dated Mar. 15, 2012.
International Search Report and Written Opinion for PCT/US11/57179 dated Jan. 5, 2012.
International Search Report and Written Opinion for PCT/US11/57180 dated Mar. 15, 2012.
International Search Report and Written Opinion for PCT/US12/37597.
International Search Report and Written Opinion for PCT/US12/41437 dated Aug. 24, 2012.
International Search Report and Written Opinion for PCT/US12/55636 dated Nov. 30, 2012.
International Search Report and Written Opinion for PCT/US12/65738 dated Apr. 19, 2013.
International Search Report and Written Opinion for PCT/US2012/027043 dated Jul. 13, 2013.
International Search Report and Written Opinion for PCT/US2012/045601 dated Feb. 1, 2013.
International Search Report and Written Opinion for PCT/US2012/069557 dated Feb. 22, 2013.
International Search Report and Written Opinion for PCT/US2013/020411 dated May 21, 2013.
International Search Report and Written Opinion for PCT/US2013/024538, dated May 31, 2013.
International Search Report and Written Opinion for PCT/US2013/031084, dated Jun. 4, 2013.
International Search Report for PCT/IS12/47092 dated Nov. 26, 2012.
International Search Report for PCT/US09/54921 dated Oct. 21, 2009.
International Search Report for PCT/US11/39178 dated Sep. 16, 2011.
International Search Report for PCT/US11/39178 dated Sep. 2011.
International Search Report for PCT/US11/49393 dated Dec. 5, 2011.
International Search Report for PCT/US11/57173 dated Mar. 15, 2012.
International Search Report for PCT/US11/65305 dated Apr. 16, 2012.
International Search Report for PCT/US12/21000 dated May 15, 2012.
International Search Report for PCT/US12/23856 dated Jun. 6, 2012.
International Search Report for PCT/US12/24772 dated Jul. 24, 2012.
International Search Report for PCT/US12/25530 dated Aug. 7, 2012.
International Search Report for PCT/US12/26205, dated May 29, 2012.
International Search Report for PCT/US12/27620 dated Aug. 10, 2012.
International Search Report for PCT/US12/39638 dated Sep. 24, 2012.
International Search Report for PCT/US12/45875 dated Nov. 16, 2012.
International Search Report for PCT/US12/56759 dated Feb. 25, 2013.
International Search Report for PCT/US12/57528 dated Dec. 17, 2012.
International Search Report for PCT/US12/57577 dated Nov. 29, 2012.
International Search Report for PCT/US12/66898 dated Feb. 11, 2013.
International Search Report for PCT/US2010/033229.
International Search Report for PCT/US2010/033547.
International Search Report for PCT/US2010/033861.
International Search Report for PCT/US2010/041860.
International Search Report for PCT/US2010/045445.
International Search Report for PCT/US2010/045500.
International Search Report for PCT/US2010/046833.
International Search Report for PCT/US2010/048344.
International Search Report for PCT/US2011/024941.
International Search Report for PCT/US2011/032093.
International Search Report for PCT/US2011/035268.
International Search Report for PCT/US2011/26734.
International Search Report for PCT/US2011/29790.
International Search Report for PCT/US2011/39178.
International Search Report for PCT/US2011/42062.
International Search Report for PCT/US2011/49393.
Shadrach, D.C. "A Weighted Metric Based Adaptive Algorithm for Web Server Load Balancing." 2009 Third International Symposium on Intelligenr Information Technology Application, http://ieeexplore.ieee.org/xpl/articleDetails.jsp?amumber=5369384, pp. 449-452.
Written Opinion for PCT/US12/27620 dated Aug. 10, 2012.
Office Action dated Mar. 28, 2018 for U.S. Appl. No. 13/278,173 (pp. 1-22).
Office Action dated Apr. 3, 2018 for U.S. Appl. No. 14/230,327 (pp. 1-35).

\* cited by examiner

Figure 1   Example Checkouts 101

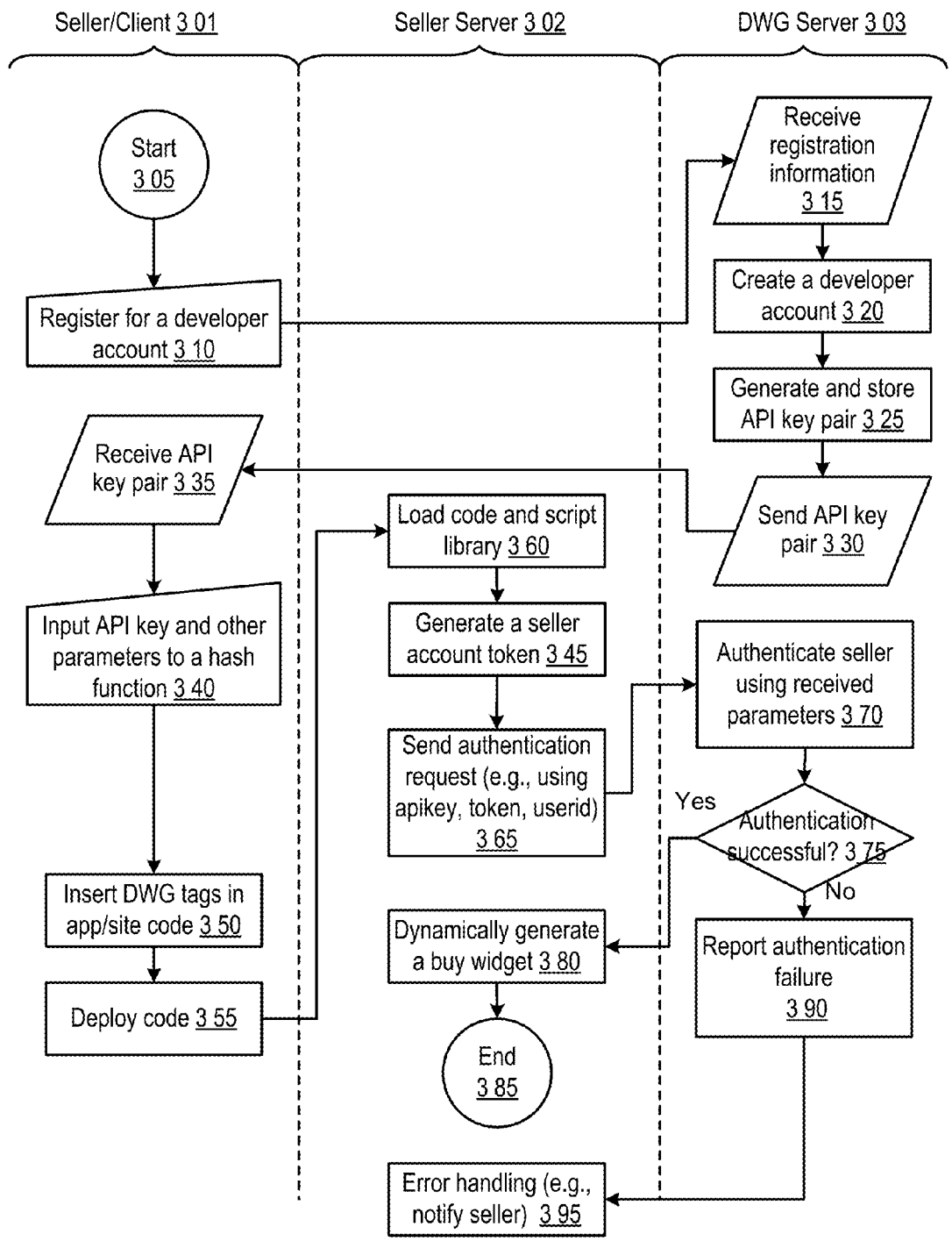
Figure 3  Example Logic Flow: Widget Generation (WG) Component 3 01

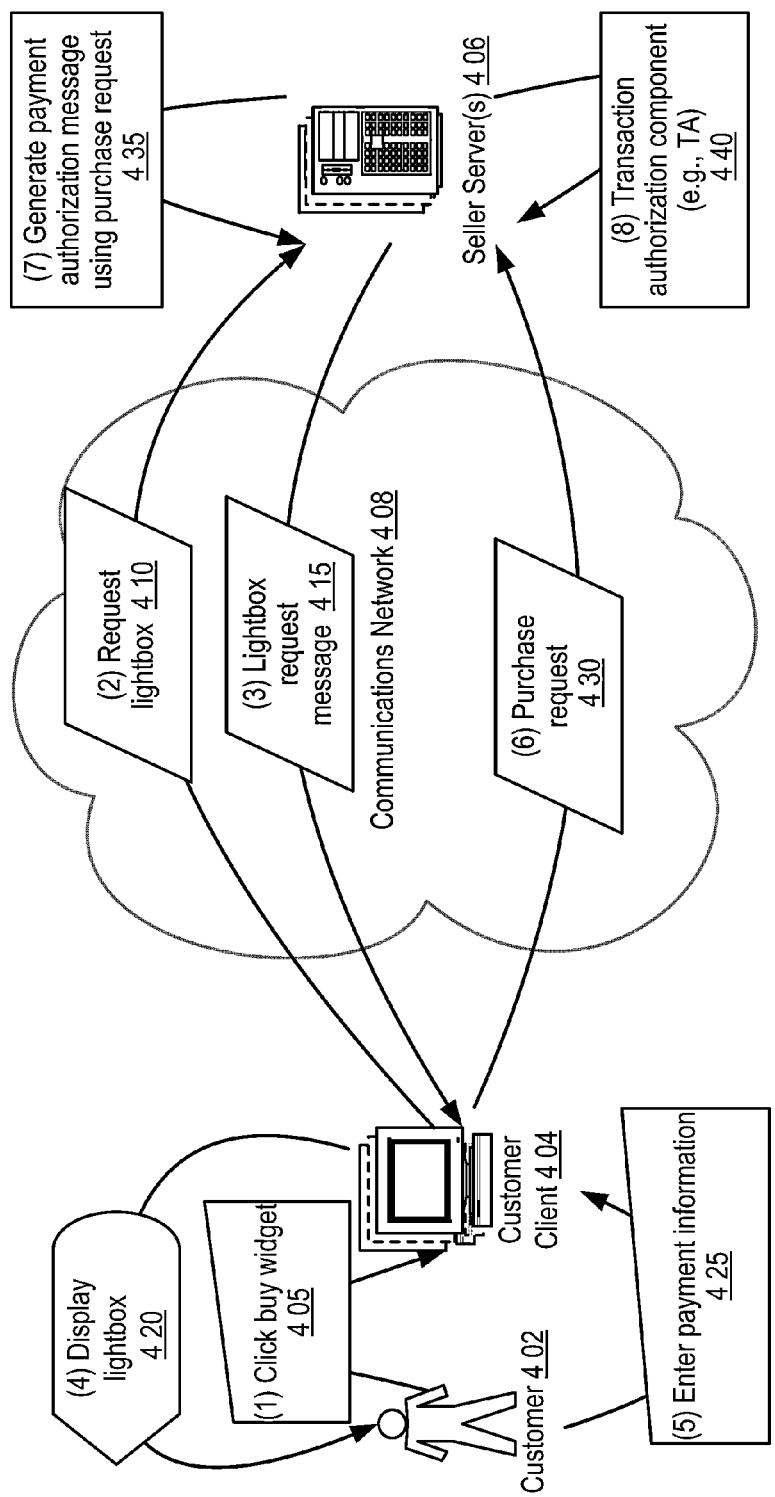

Example Widget Customization via Test Tool v:init

```
<!-- v:buy root container -->
<div id="v-root"></div>
<!-- Initialize Widgets -->
<v:init apikey="L5aWQDLKBRYCZ2X05"></v:init>
<!-- Site content and v:buy buttons (see below) -->
<script type="text/javascript" src="https://sandbox-static.v.me/js/1/v-widgets.js"></script>
```

7.01 v:buy amount: 99.95  7.02 currency (required) USD  7.03 product-id: Testproduct1  7.04 merch-trans: MERCHORDER124  7.05 collect-shipping: true ▼  7.06 process: validate ▼  7.07

Preview Lightbox

Click widget button below to preview the checkout experience.

[V me buy Vme] 7.08

[Customize Widget Skin]

Sample Code (will automatically update when you change parameters):

```
<v:buy
  apikey = "L5aWQDLKBRYCZ2X05"
  token = "4a7s2d0bb67f2491a23567"
  custom_widget_skin = "7D588"  7.09
  amount = "99.95"
  currency = "USD"
  product-id = "Testproduct1"
  merch-trans = "MERCHORDER1234"
  collect-shipping = "true"
  process = "validate">
</v:buy>
```

[Save Widget for Later] 7.10   [Bulk Generate Widgets] 7.11

Figure 7a

Example User Interface: Widget Code Generator with Integrated Testing

Figure 7b — Example User Interface: Widget Skin Customization

Bulk Generate Widgets

Upload New Data File:
Choose File No file chosen  7.18

Current Data File: myproducts.xls  7.19

Match file fields:

Field  7.20      Default Override Value

| | | |
|---|---|---|
| Amount | columnA (amount) ▼ | |
| Currency | columnC (currency) ▼ | 7.21 |
| Product ID | columnE (prod_id) ▼ | |
| Merchant-Trans | Default Override ▼ | |
| Collect-shipping? | Default Override ▼ | 7.22 |
| Process? | Default Override ▼ | 7.23 |

Bulk Generate Widgets  7.25

Save Widget for Later    Bulk Generate Widgets 7.17

---

```
<!-- vbuy root container -->
<day id="v-root"></div>
<!-- Initialization -->
<v:init>
    <!-- ... -->
    <accept>
``` v:buy
amount:
9.95
currency:
USD
product-id:
Testprod
merch-tr
MERCHO
collect-sh
true ▼
process:
validate ▼

Figure 7c     Example User Interface: Bulk Widget Generation

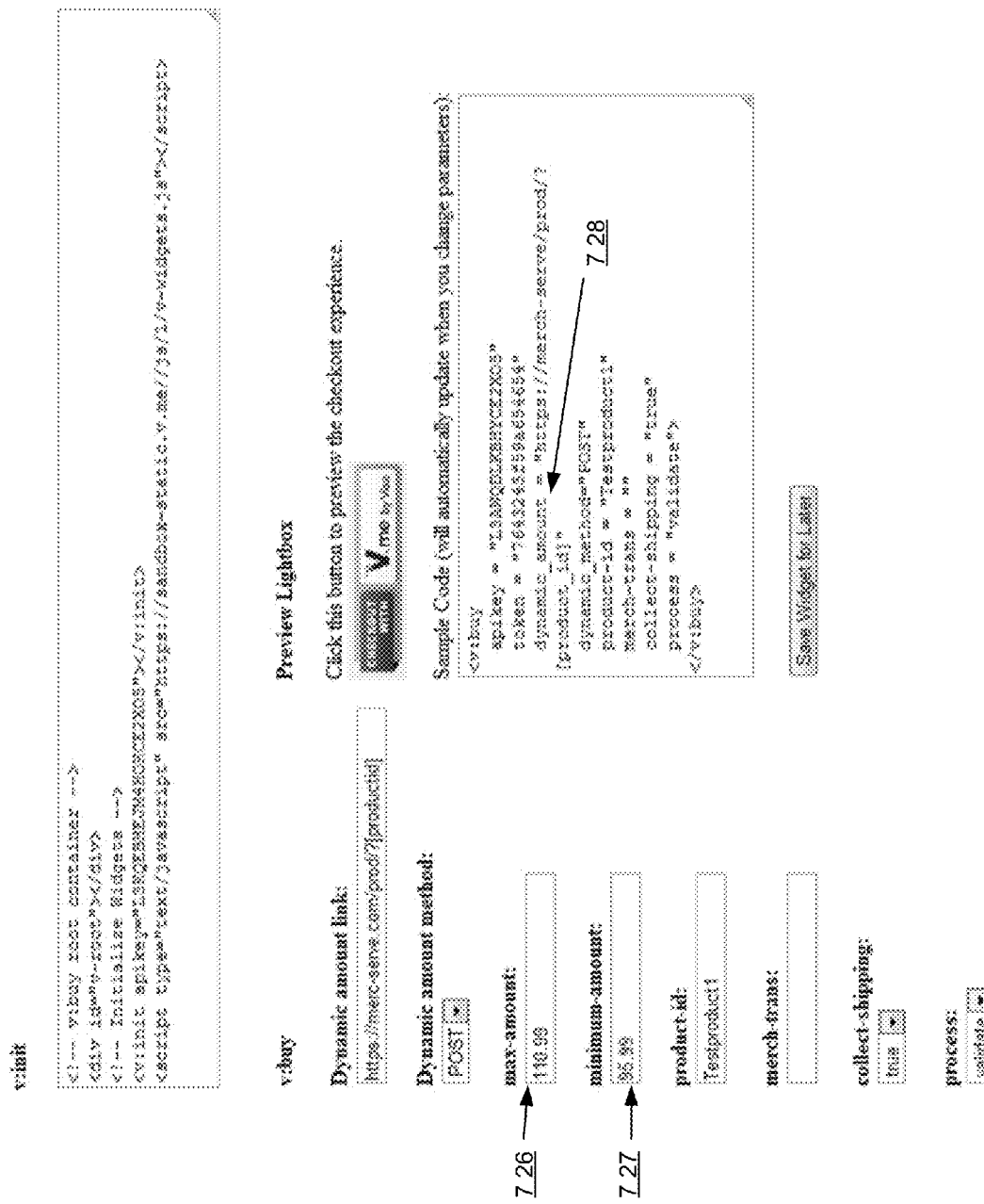
Figure 7d — Example User Interface: Widget Code Generator with Dynamic Content Retrieval

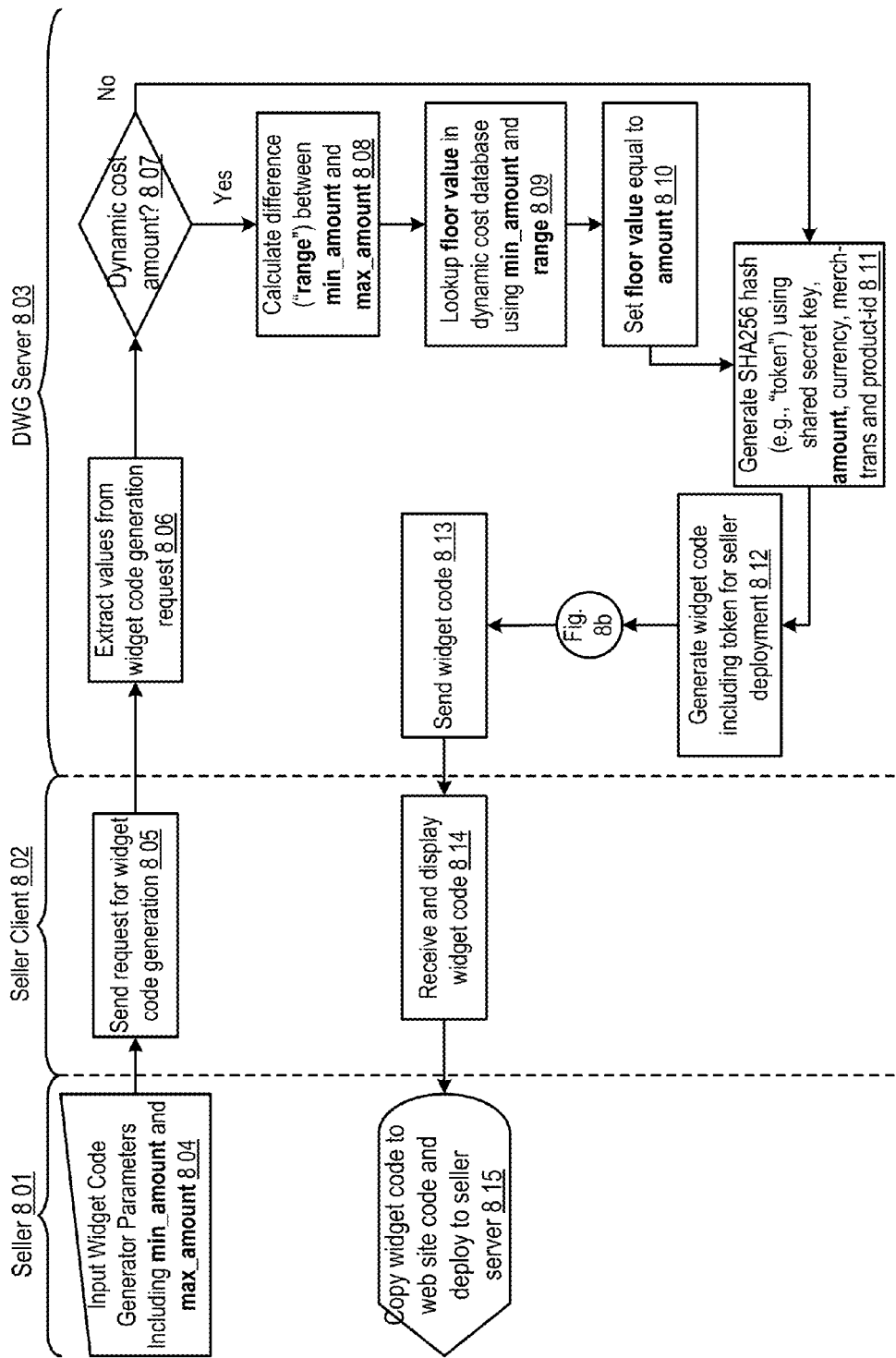
Figure 8a    Example Logic Flow: Widget Code Generator with Dynamic Content Retrieval (e.g., "DCR" Component 8000)

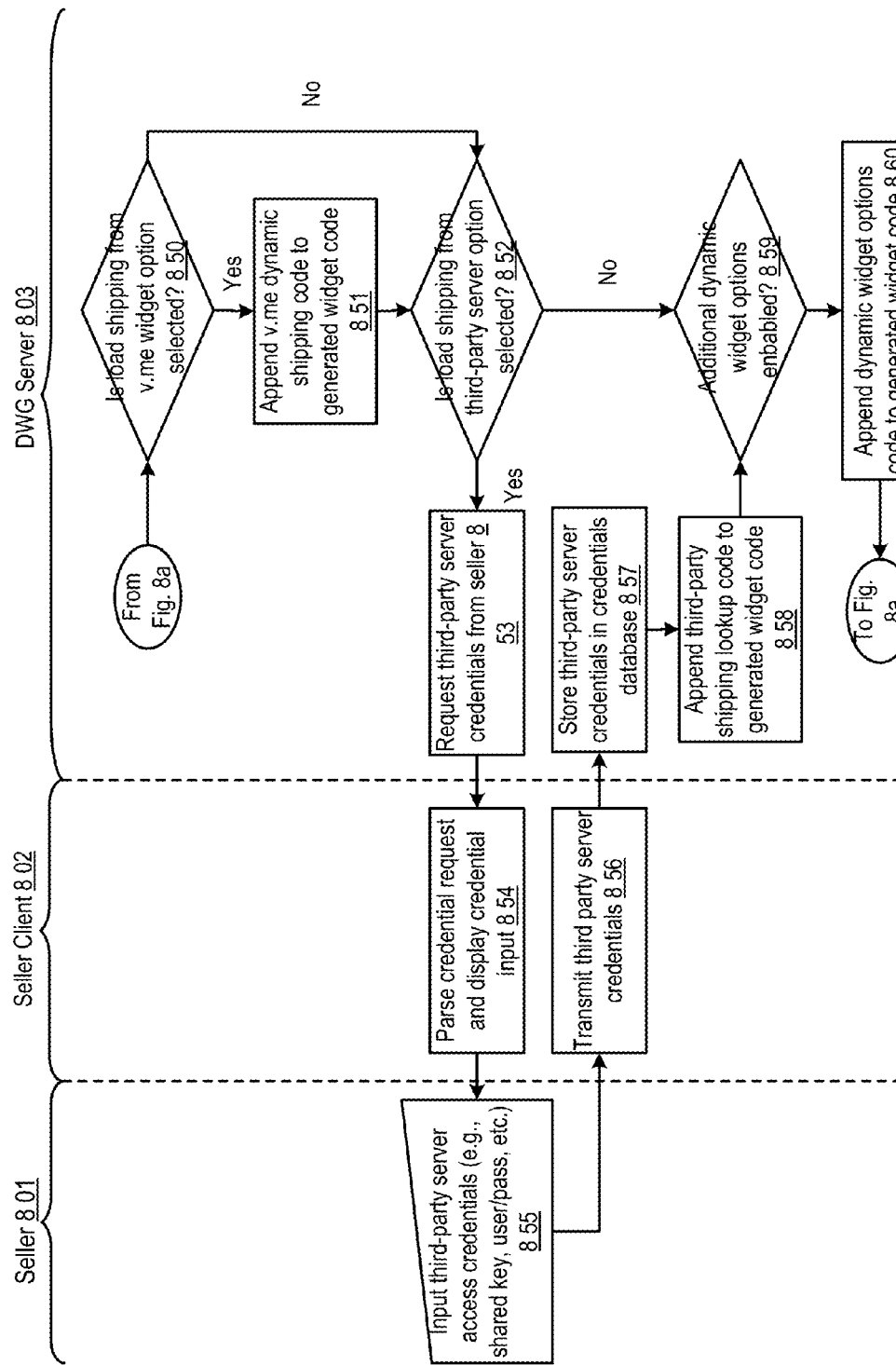
Figure 8b  Example Logic Flow: Widget Code Generator with Dynamic Content Retrieval (e.g., "DCR" Component 8000)

DYNAMIC WIDGET GENERATOR APPARATUSES, METHODS AND SYSTEMS

PRIORITY CLAIM

This application claims priority under 35 USC § 119 to: U.S. provisional patent application Ser. No. 61/570,230 filed Dec. 13, 2011, entitled "DYNAMIC WIDGET GENERATOR APPARATUSES, METHODS AND SYSTEMS"; and U.S. provisional patent application Ser. No. 61/639,843 filed Apr. 27, 2012, entitled "DYNAMIC WIDGET GENERATOR APPARATUSES, METHODS AND SYSTEMS". The entire contents of the aforementioned applications are expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to payment integration, and more particularly, to DYNAMIC WIDGET GENERATOR APPARATUSES, METHODS AND SYSTEMS.

BACKGROUND

Online sellers accept digital payments to conduct transactions with buyers. Payment management platforms such as CyberSource and Authorize.Net are available to e-commerce merchants for payment processing.

BRIEF DESCRIPTION OF THE DRAWINGS

The accompanying appendices and/or drawings illustrate various non-limiting, example, innovative aspects in accordance with the present descriptions:

FIG. 3 shows a logic flow diagram illustrating dynamic widget generation component in some embodiments of the DWG;

FIG. 4 shows a data flow diagram illustrating dynamically generated widget purchase in some embodiments of the DWG;

FIGS. 7a-d show user interfaces illustrating example widget code generator with integrated testing in some embodiments of the DWG;

FIG. 8a-b shows a logic flow diagram illustrating a widget code generator with dynamic content retrieval component in some embodiments of the DWG.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The DWG platform facilitates parties such as sellers to add payment acceptance to their applications or websites with a simple integration. The DWG platform allows sellers (or developers working for the sellers) to customize payment acceptance using dynamically generated buy buttons or widgets that capture payments from customers.

DWG

Figure 1:
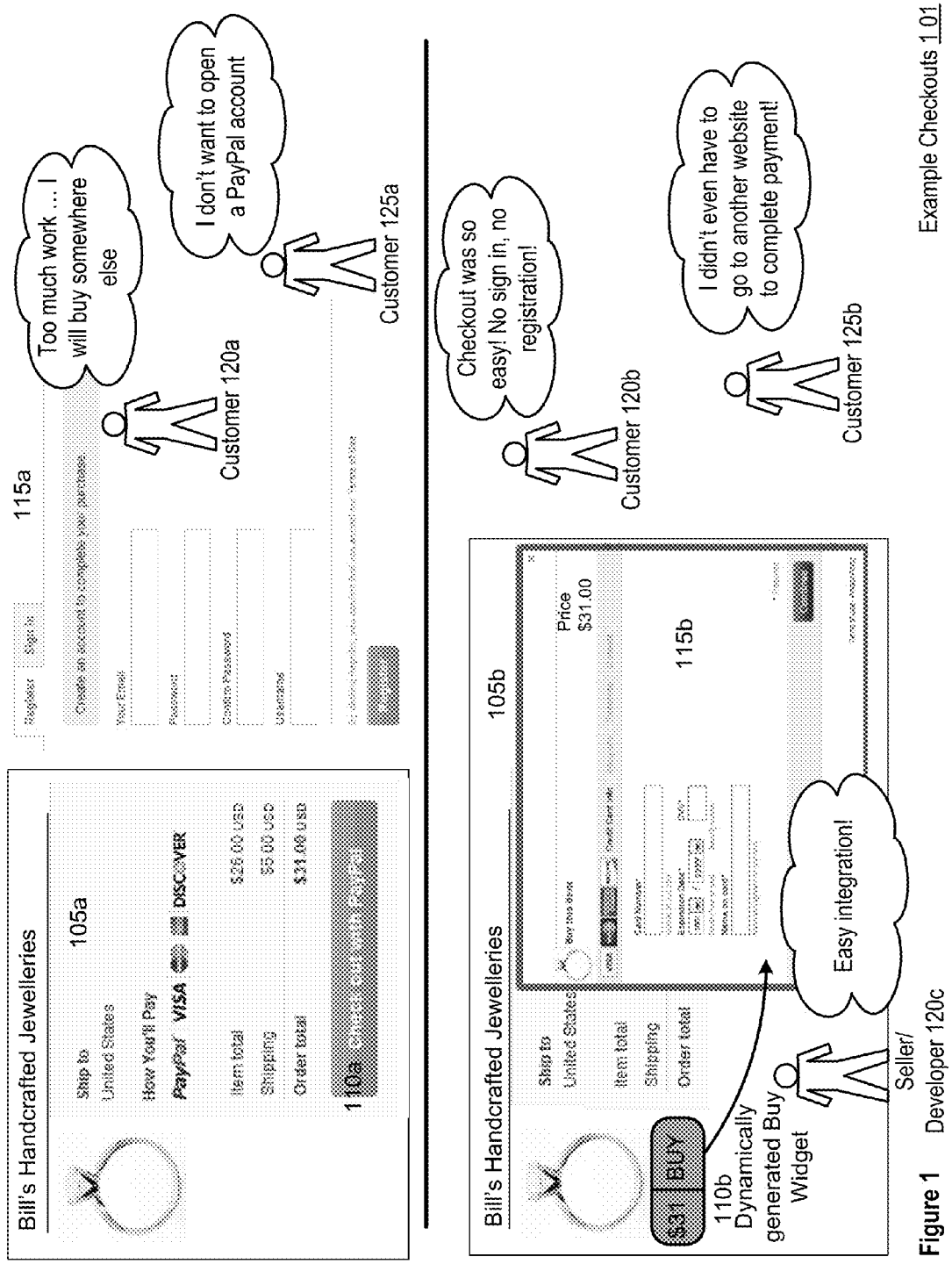
FIG. 1 shows a block diagram illustrating example checkouts in some embodiments of the DWG.

FIG. 1 is block diagram illustrating an example checkouts in some embodiments of the DWG. As shown in the figure, a web page 105a has a checkout option using PayPal. Customers 120a, 125a may click on the "Check out with PayPal" button 110a to initiate the transaction. The clicking of the button 110a may take the customers 120a, 125a to another page 115a where the user may need to register for a new account or sign in. For customers 120a and 125a, such a checkout option may be inconvenient and thus may lead to the customers abandoning their shopping carts before completing the purchase.

On the other hand, an example web page 105b, also shown in FIG. 1, may have an integrated payment acceptance that allows easy checkout. For example, customers 120b and 125b visiting web site or in an application 105b may want to buy an item. In this case, he or she may click a buy button 1100b (e.g., V.me buy button) that is dynamically generated and coded into the web page. A payment application 115b (e.g., a lightbox) may be invoked and may be overlayed on top of the web page 105b. The customers may select a payment method and enter payment information on the payment window 115b to complete the purchase. The checkout process is thus made simpler for the customer, with no registration or signing in required. In instances where there is a card on file, a wallet functionality may be invoked by the buy button, and the purchase may be completed in one click or action via the wallet. The customer may then receive the item, and the transaction may be settled through the merchant's account.

In addition to the ease of checkout for customers, the seller and/or developer may have obtain the advantages of easy integration of payment acceptance as the seller needs to insert a few DWG platform tags and a few code snippets to generate a buy button that accepts various forms of payments including customer's wallet and gets the seller paid. In some implementations, sellers and/or merchants may obtain and analyze buying trends and other analytics through data collected from the buy widget based purchases.

Figure 2:
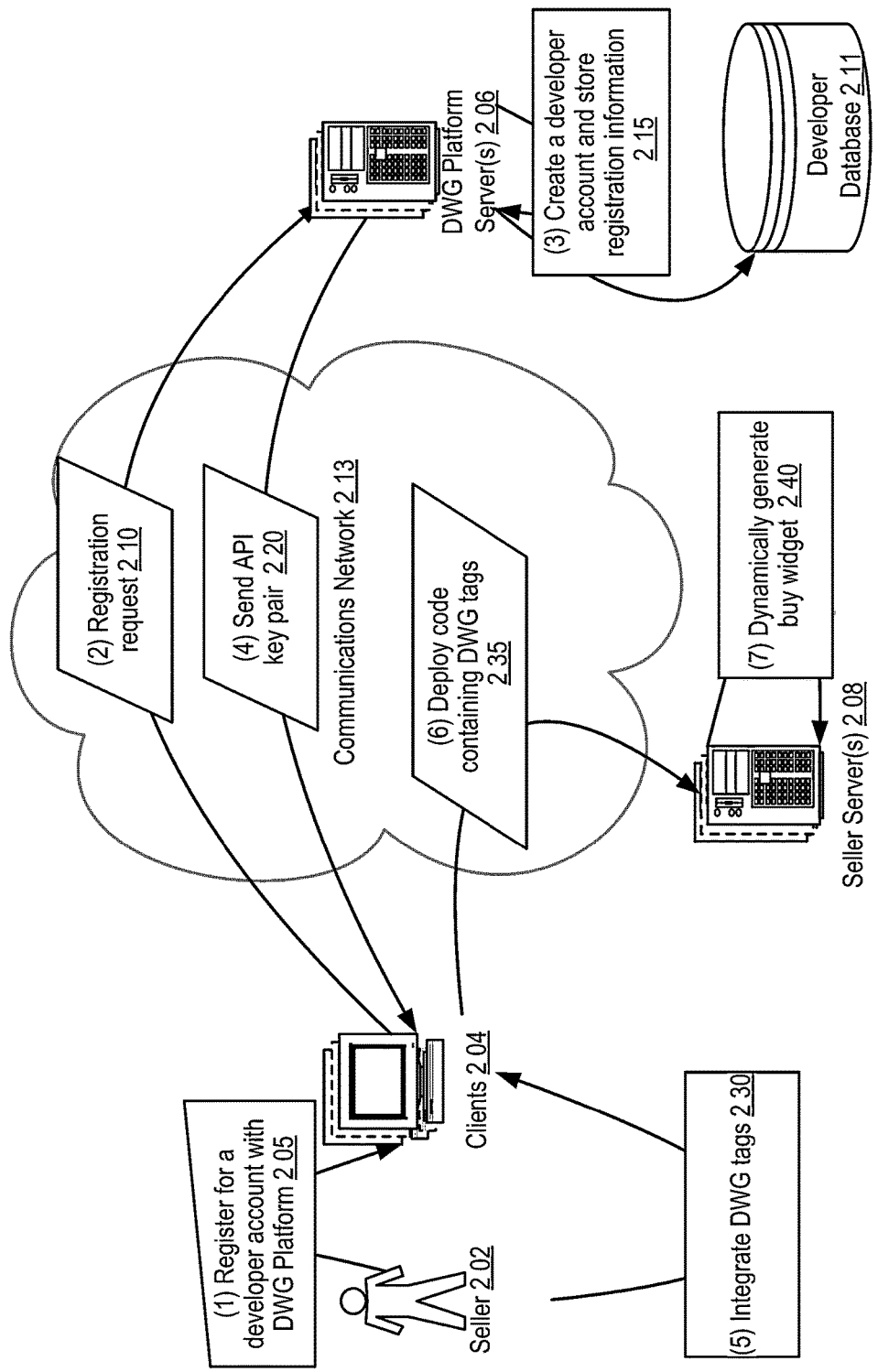
FIG. 2 shows a data flow diagram illustrating dynamic widget generation in some embodiments of the DWG.

FIG. 2 shows a data flow diagram illustrating dynamic widget generation in some embodiments of the DWG. In one embodiment, a seller 202 (or a developer) may use a client 204 to register as a developer in the DWG Platform at 205. During registration, the seller may provide login and/or other identifying information such as a name, country, currency, email address, password, userid, postback URL, and/or the like. The client 204 may then generate a registration request 210 using the information supplied by the user during registration. An example registration request 210, substantially in the form of an HTTP(S) POST message including XML-formatted data, is provided below:

```
POST /registration_request.php HTTP/1.1
Host: www.v.me
Content-Type: Application/XML
Content-Length: 667
<?XML version = "1.0" encoding = "UTF-8"?>
<registration_request>
    <request_ID>4NFU4RG94</request_ID>
    <timestamp>2011-12-12 15:22:43</timestamp>
  <user_details>
    <user_ID>JDoe</user_ID>
    <password>JDoeloves2sing</password>
    <firstname>Joe</firstname>
    <lastname>Doe</lastname>
    <email>JDoe@gmail.com</email>
    <country>Canada</country>
    <currency>Canadian dollars</currency>
    <postback_URL>http://billsjewellery.com/response</postback_URL>
    <client_detail>
       <client_IP>192.168.23.126</client_IP>
       <client_type>smartphone</client_type>
       <client_model>HTC Hero</client_model>
       <OS>Android 2.2</OS>
       <app_installed_flag>true</app_installed_flag>
     </client_detail>
  </user_details>
</registration_request>
```

Upon receiving the registration request from the seller, the DWG platform server may, at 215, create a developer account and store the details of the account in a developer database 211. The DWG platform server may further generate and/or provide an API key pair to the client 204 at 220. In one implementation, the API key pair may include a public key and a shared secret key. The public key may be used as an apikey parameter value in an initialization tag and buy button tag discussed in further detail below. The shared secret key may be used to generate encrypted tokens necessary for authenticating the seller with the DWG platform server. Example tags which use the shared secret key as one of the parameters are shown below:

| Tag/Widget | Parameters | Description |
| --- | --- | --- |
| v:init | sharedsecretkey, userid | |
| v:buy | sharedsecretkey, amount, currency, product-id | This token may be generated with these required parameters for each product with a buy button in an app, as the parameters will vary. |

At 230, upon receiving the API key pair from the DWG platform server(s) 206, the developer may begin coding. Coding may involve inserting a root tag (v-root) just below the <body> tag of the application or website code. In one implementation, the root tag may be placed elsewhere in the page. In another implementation, the root tag may need to be placed just below the body tag to facilitate proper loading of the lightbox. The placement of the root tag may be relative to the root element in the Document Object Model (DOM) document. An example root tag, substantially in JavaScript, is provided below:

```
<body>
   <div id="v-root"></div>
```

The developer may then add an initialize tag (v:init) below the root tag (v-root) and before any buy button tags. The initialize tag may identify the user and page attributes for handling events using various parameters. For example, the initialize tag may set the API key and token to authenticate the seller with the DWG. Exemplary parameters for the initialize tag include, without limitation, apikey, token, userid, logo-url, country and callback. The apikey may be a string value that identifies the general API access configuration and developer settings for the site or application.

The token may be the encrypted token for the user account. It may be a string that is created by the MD5 Message Digest Algorithm hash of API secret shared key and userid. In one implementation, the parameters to the hash may not include any spaces, quotes or delimiters. These tokens may also be used as values for tokenid in DWG's buy button parameters. A DWG MD5 hash may be generated by running an appropriate function on a concatenated string of particular parameter values such as the shared secret key and userid in a proper sequence. In one implementation, the sequence may not have any spaces or delimiters. Example DWG MD5 hash syntax for languages such as JAVA, PHP, RUBY and PYTHON is provided below:

| Language | Standard Syntax for Generating MD5 Hash |
| --- | --- |
| Java | import org.apache.commons.codec.digest.*; <br> hash = DigestUtils.md5Hex(string$_1$ + string$_2$ + string$_3$ . . . ); |
| PHP | $hash = md5($string$_1$.$string$_2$.$string$_3$ . . . ); |
| Ruby | require 'digest/md5' <br> hash = Digest::MD5.hexdigest(string$_1$ + string$_2$ + string$_3$ . . . ) |
| Python | import md5 <br> hash = md5.new(string$_1$ + string$_2$ + string$_3$ . . . ) |

The userid parameter is an application or game user registered and/or developer authenticated parameter. The userid may be a string representing a unique non-changing user in the developer's system. The logo-url is a string that indicates the absolute path to an image to be displayed in the payment widget. The logo-url in some implementations may be optional. The country parameter may be a string that sets the country where the application is running and may be auto-detected. The default value may be set to, for example, the United States. The callback parameter may be a string function that listens for events triggered by DWG platform widgets. The callback parameter may, in one implementation, be a globally accessible static JavaScript function. An example initialize tag, substantially in JavaScript, including one or more of the above described parameters is provided below:

```
<v:init apikey = "bbb8aae57c104cda40c9"
   token = "ed0f2847b36f27e19e5613e9e73aeda1"
   userid = "JDoe1970"
   callback="handleVmeEvents">
</v:init>
```

The initialize tag may also include the userid of the developer and a callback function discussed in further detail below. The developer may continue coding by inserting a script tag just above the </body> tag. The script tag may link to the DWG platform JavaScript Software Development Kit (SDK) for loading the DWG platform JavaScript SDK library into the application or web page. In one implementation, the library may scan a web page for buy button tags and replace them with buy buttons customized for the product items in an application or site. An example script tag, substantially in JavaScript, is provided below:

```
<script type="text/javascript"
    src="http://api8.ultimatepay.com/js/1/v-widgets.js"></script>
</body>
```

The developer may also add a DWG platform buy button tag (v:buy) to dynamically generate a buy button or widget that allows a customer to buy selected products. A number of parameters may be included in the buy button tag. Example parameters include apikey, token, amount, currency, product-id, product-desc, merch-trans, dom-id, callback, and/or the like. These parameters may be of string type. In some implementations, parameters such as product-desc, merchant-trans, dom-id and callback may be optional. An apikey key may identify API access configuration and developer settings for an application and may be the key that is provided during the on-boarding process. A token is an encrypted purchase token for a purchase. It may be created by the md5 hash of API secret shared key, amount, currency, product-id, and/or the like. An amount is the price of an item being purchased. In one implementation, the value of the amount may be displayed on the widget and is the payment that is requested from the customer's account on behalf of the seller. A currency is a parameter that sets the currency for display. A product-id is a unique non-changing identifier for an item or product in the seller's catalog or store. A product-desc is an end user friendly description of goods or services corresponding to a product-id. A merch-trans may be a transaction id for tracking purchase activity. This id may pass through the system and may be available to developers in all status replies. A dom-id may be a DOM element id that is used as a trigger for a purchase action. For example, if a valid dom-id is specified, the default or themed DWG platform buy widget may not be displayed. A callback is a globally accessible static JavaScript function that listens for events triggered by DWG platform widgets. An example buy button or widget tag, substantially in JavaScript, and including some of the parameters discussed above, are provided below:

```
<v:buy apikey = "aK2Leiv89j2A1_1On4s1"
    token = "12f049788f4b67dc9cc58529769fb9d2"
    amount = "100"
    currency = "USD"
    product-id = "sku856781"
    callback = "handleVmeEvents">
</v:buy>
```

At 230, the developer may inset these tags (v:root, v:init, script and v:buy) to the existing code. The completed code may then be deployed to the seller server(s) 208 at 235. At 240, the inserted code snippets may dynamically generate a DWG platform buy button or widget. In some embodiments, the buy button tag may be dynamically generated server-side in the code. For basic product offerings with no changes to any of the values, the buy button may be generated once and used many times. Using a test tool (shown in FIG. 6), the developer may generate static buy button tags for a site. In some other embodiments, the test tool may be used to check the hashing algorithm in the code, or simply to become better accustomed to the DWG platform buy button fields. In yet other embodiments, the buy button widget may be customized with a logo-url (e.g., in the initialize tag), product description, and/or the like.

FIG. 3 shows a logic flow diagram illustrating dynamic widget generation component in some embodiments of the DWG. In one embodiment, starting at 305, the seller using his or her client device 301 registers for a developer account with the DWG server 303 at 310. The registration includes the seller supplying registration information such as name, email, userid, password, country, currency, postback URL, and/or the like. The registration information is received at 315 by the DWG server 303. The DWG server 303 may then parse the received information and use the parsed information to create a developer account at 320. At 325, an API key pair including a public key and a shared secret key may be generated and stored in association with the seller account in one or more databases and/or tables. The API key pair may then be transmitted to the seller at 330. The seller may, upon receiving the API key pair at 335, input the shared secret key and other parameters to a hash function (e.g., MD5 hash) at 340. The seller may, at 350, insert tags (v:root, v:init, script and v:buy) in his or her app or site code. The completed code may then be deployed at 355 to the seller server(s) 302.

The seller server(s) 302 may load the code and JavaScript libraries at 360. At 345, the seller account token may be generated for each product item listed in the application or site. At 365, an authentication request may be sent to the DWG server(s) 303 to authenticate the seller. The authentication request may include parameters such as apikey, token, userid, and/or the like. The DWG server(s) 303 may receive the request and may authenticate the seller using the received parameters at 370. If the authentication is successful at 375, the DWG server(s) may transmit a successful authentication message and the seller server(s) 302 may dynamically generate a buy widget at 380, ending the process at 385. If, however, the authentication is unsuccessful, the DWG server(s) 303 may report authentication failure to the seller server(s) 302 at 390. The seller server(s) 302 receiving authentication failure message may invoke processes for handling error, such as notifying the seller by email, or logging the error.

FIG. 4 shows a data flow diagram illustrating dynamically generated widget based purchase in some embodiments of the DWG. A customer 402 may wish to check out a product from a seller's web site. The customer may click the buy widget on the seller's web site at 405 to initiate purchase. The customer's client device 404 may then generate and send a payment widget (e.g., lightbox) request at 410 to the seller's server 406. An example payment widget request 410, substantially in the form of an HTTP(S) POST message including XML-formatted data, is provided below:

```
POST /paymentwidget_request.php HTTP/1.1
Host: www.bobsjewelleries.com
Content-Type: Application/XML
Content-Length: 667
<?XML version = "1.0" encoding = "UTF-8"?>
<paymentwidget_request>
    <timestamp>2011-12-12 15:22:43</timestamp>
    <amount>100</amount>
    <currency> USD</currency>
    <product-id> sku856781</product-id>
  <client_detail>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
    </client_detail>
  </client_detail>
</paymentwidget_request>
```

The seller's server 406 may respond with a payment widget (e.g., lightbox) at 415. The payment widget (e.g., lightbox) may then be displayed at the client 404 at 420. The customer may then enter payment information into the displayed payment widget at 425. At 430, the client 404 may take the entered payment information, and generate a purchase request message for transmission to the seller server(s) 406 at 430. An example purchase request 430, substantially in the form of an HTTP(S) POST message including XML-formatted data, is provided below:

```
POST /purchase_request.php HTTP/1.1
Host: www.bobsjewelleries.com
Content-Type: Application/XML
Content-Length: 667
<?XML version = "1.0" encoding = "UTF-8"?>
<purchase_request>
    <timestamp>2011-12-12 15:22:43</timestamp>
    <nameoncard>John Doe</nameoncard>
    <creditcard_number>4444444444444448</creditcard_number>
    <expiration_month>05</expiration_month>
    <expiration_year>2014</expiration_year>
    <cvv>2345</cvv>
    <street_address>22 Pleasantville</street_address>
    <city>Beverley Hills</city>
    <zipcode>90210</zipcode>
  <client_detail>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
    </client_detail>
  </client_detail>
</purchase_request>
```

The seller server(s) may generate a payment authorization message using the purchase request at 435. Further, at 440, the seller server(s) may invoke purchase transaction authorization component which facilitates payment processing via payment gateway and settlement of funds between associated acquirers and issuers.

Figure 5A:
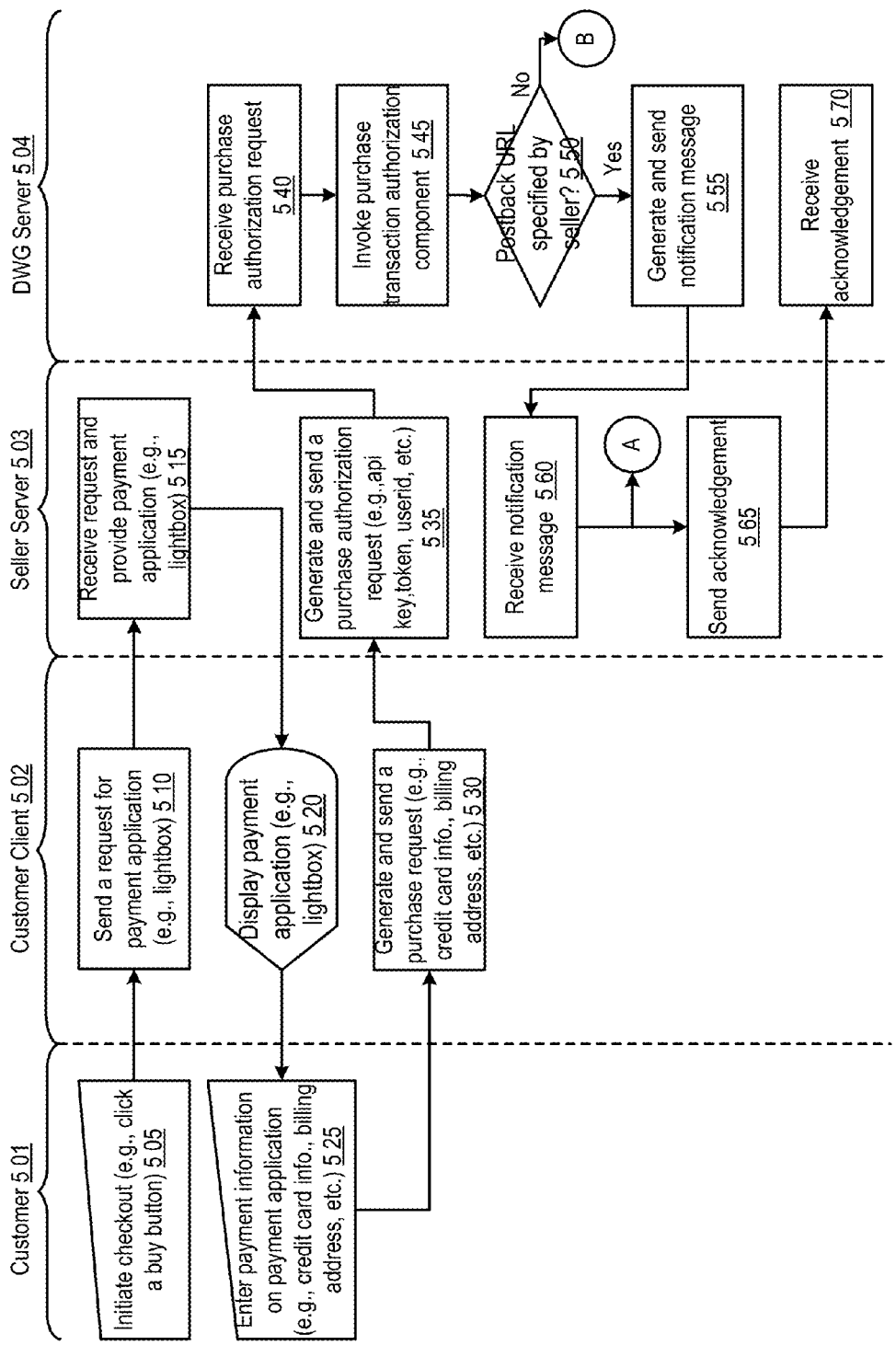
FIGS. 5a-c show logic flow diagrams illustrating dynamically generated widget purchase in some embodiments of the DWG.
Figure 5B:
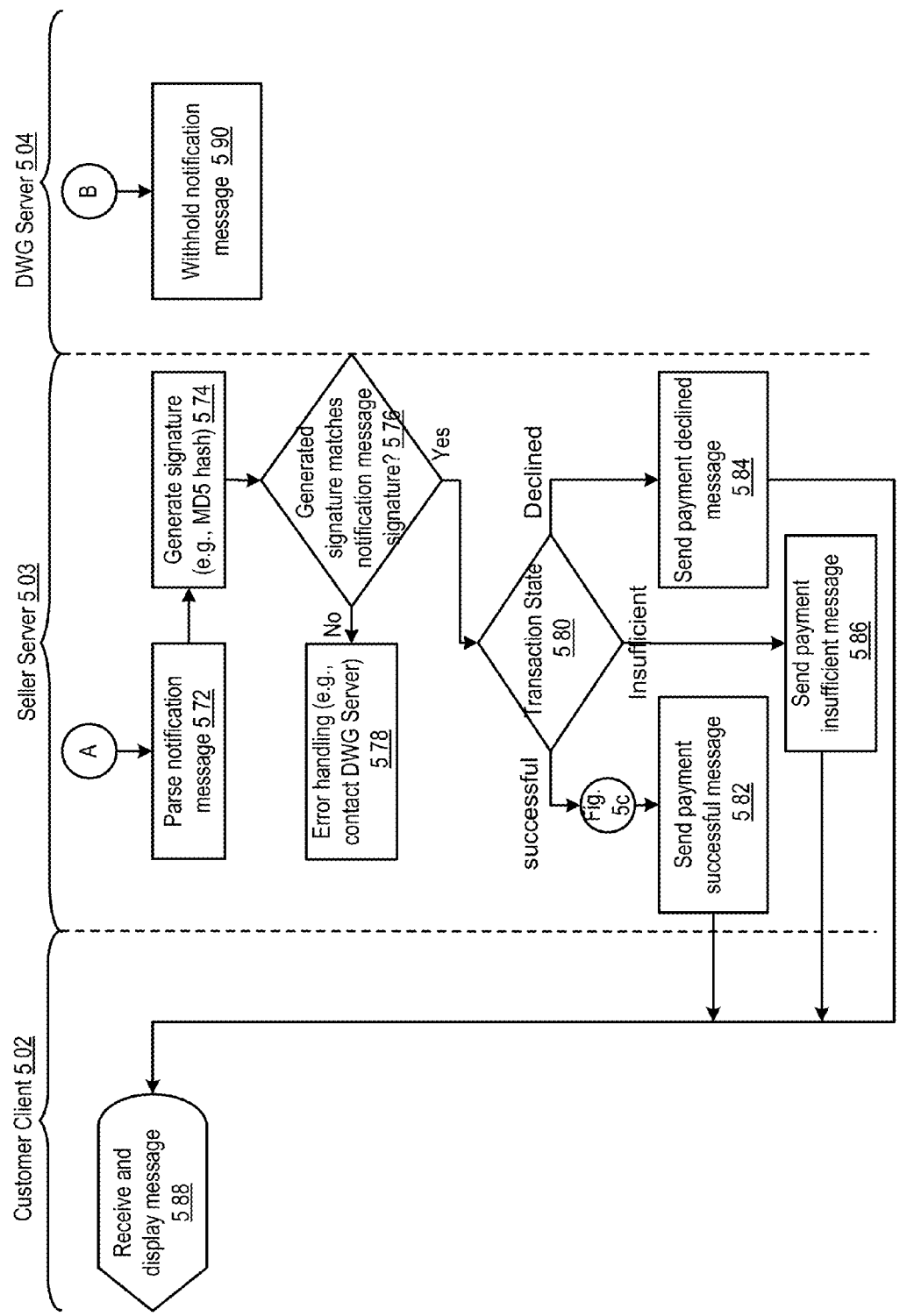

FIGS. 5*a-b* show logic flow diagrams illustrating dynamically generated widget purchase in some embodiments of the DWG. In one embodiment, a customer 501 may initiate checkout of an item from a seller site at 505. The checkout may be initiated by clicking or tapping on a buy widget using a customer client 502. The click on the buy widget may generate a request for a payment application (e.g., a lightbox) at 510 from seller server(s) 503. At 515, the seller server(s) 503 may receive the request and may provide the requested payment application to the customer client 502 at 515. The customer client 502 may display the payment application at 520. When the payment application is displayed on the customer client 502, the customer 501 may enter payment information in one or more fields of the payment application at 525. Credit card information, billing address, and/or the like may be provided by the customer to complete purchase. The customer client may then take the customer payment information and generate a purchase request at 530. The purchase request may then be sent to the seller server(s), which may generate a purchase authorization request and send the request to the DWG server(s) 504 at 535. The DWG server(s) may receive the purchase authorization request at 540, and may invoke a purchase transaction authorization component at 545.

Some embodiments of the DWG platform may handle notifications and callbacks. The notifications and callbacks may facilitate customization of payment experience, data collection and a better user experience. Notifications may be available from the DWG platform for each transaction. There are multiple options for receiving a notification. One of these options are callback functions. Some of the callback methods are discussed in further detail below.

At 550 the DWG server(s) may determine whether a postback URL has been specified by the seller. If a postback URL has been specified, the DWG server(s) may generate and send a notification message at 555. The notification message may be received at 560 by the seller server(s). Upon receiving the notification message, the seller server(s) may send an acknowledgement back to the DWG server(s) at 565 to confirm receipt of the message. In some implementations, the DWG server(s) may resend the notification message a finite number of times until an acknowledgement is received. If the seller has not set up a postback URL, the DWG server may not be able to communicate any notifications to the seller, and the notification may be withheld at 590.

After receiving the notification message at 560, the example logic flow of FIG. 5*a* continues at FIG. 5*b*, where the seller server(s) parses the notification message at 572 to extract fields of information including a signature in the notification message. At 574, the seller server(s) may generate a signature key in the same way the DWG generated the signature key in the notification message. At 576, the two signatures are compared to determine if they match. If there is no match, error handling processes may be invoked at 578. For example, the seller may need to contact the DWG server(s) to resolve the issue. On the other hand, if the two signature keys match, the notification message is authenticated. At 580, the seller server(s) may determine the state of the transaction by examining the parsed notification message. When the transaction state is insufficient or declined, messages 586 and 584 respectively may be sent to the client device for display. If the transaction state in the message is successful, the logic flow may continue with respect to FIG. 5*c*.

Figure 5C:
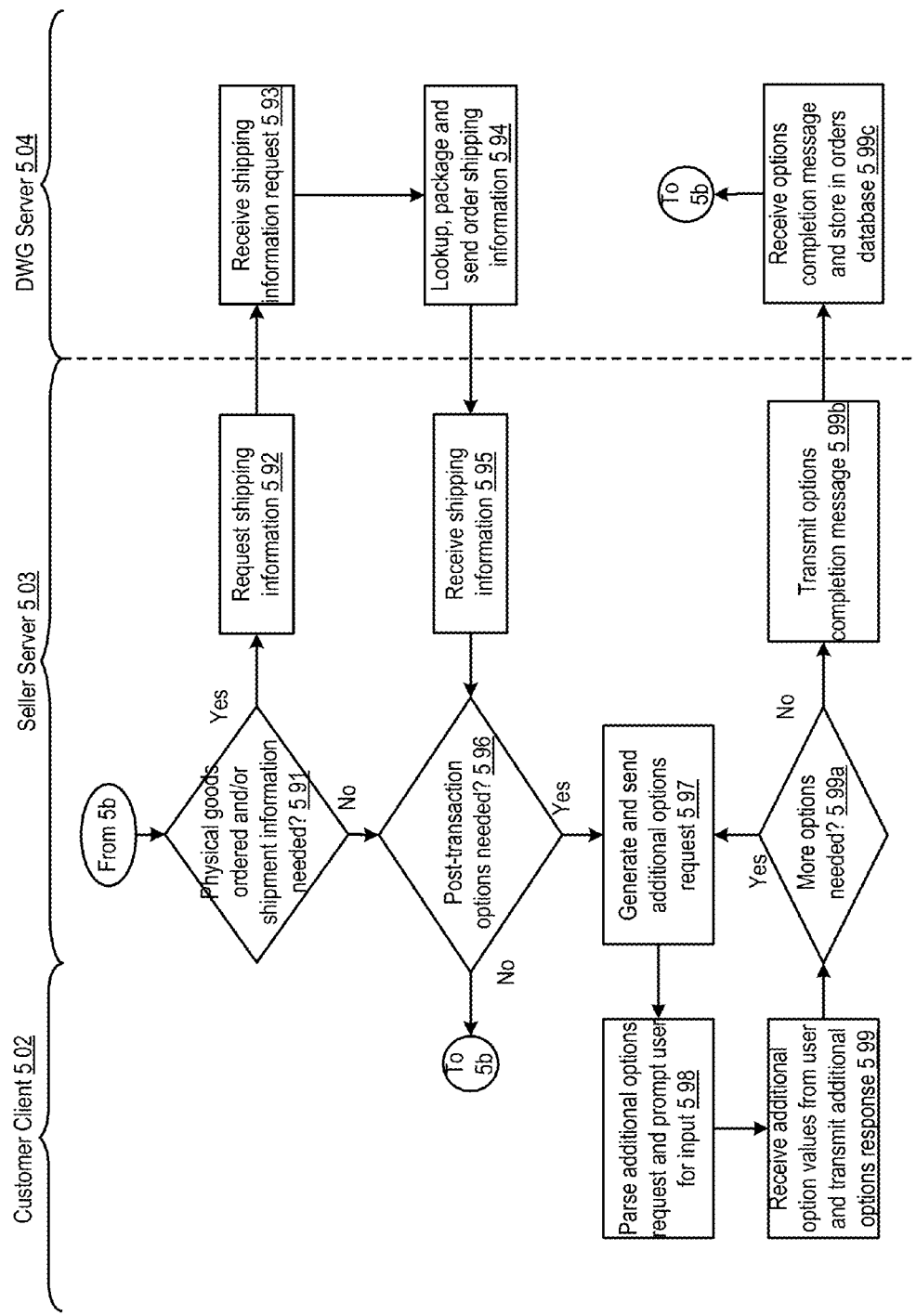

With respect to FIG. 5C, the seller server may determine if the goods that have been ordered are physical goods or goods that may require the seller to retrieve a shipping address. An example of physical goods may be a DVD player, a product delivered by a commercial carrier such as UPS or FedEx, a hand delivered product such as a gift basket, and/or the like. If physical goods are being ordered, the seller server 503 may poll the DWG server 504 for shipping information. For example, the seller server 503 may issue a request for shipping information, e.g., 592. In one embodiment, the shipping information request 592 may be in the form of a web services call, such as SOAP, XML-RPC, or REST. An example shipping information request 592, substantially in the form of an HTTP(S) POST message including XML-formatted data, is provided below:

```
POST /shipping_info_request.php HTTP/1.1
Host: www.server.com
Content-Type: Application/XML
Content-Length: 667
<?XML version = "1.0" encoding = "UTF-8"?>
<transaction_detail_request>
    <paytxnid>6565E324756</paytxnid>
    <adminid>7643</adminid>
</transaction_detail_request>
```

In one embodiment, the DWG server will then receive the shipping information request, e.g., 593. The DWG server 504 may send the shipping information request to a third-party server for processing or may process the request locally. For example, the DWG server may extract the identifier specifying the order for which shipping information is requested, e.g., paytxnid and/or the like, or may look-up the order in an orders database using session information and/or the like. The DWG server may then reply to the seller server with shipping information for the order, and/or other information available about the order. In one embodiment, shipping information is not requested and instead other information about an order processed at the DWG server or elsewhere is requested. For example, user information, session information, product information, and/or the like may be requested. In one embodiment, the response from the DWG server may be sent to the seller server 503. An example shipping information response, e.g., 594, 595, substantially in the form of an HTTP(S) POST message including XML-formatted data, is provided below:

```
POST /response.php HTTP/1.1
Host: www.server.com
Content-Type: Application/XML
Content-Length: 667
<?XML version = "1.0" encoding = "UTF-8"?>
<transaction_detail_response>
    <status>CAPTURED</status>
    <call-id>114564353</call-id>
    <paytxnid>101440637</paytxnid>
    <amount>49.95</amount>
    <currency>USD</currency>
    <products>
        <product>
            <product-id>1234</product-id>
            <product-descrp>Sony DVD Player</product-descrp>
        </product>
        <product>
            <product-id>5478</product-id>
            <product-descrp>14-inch Tablet PC</product-descrp>
        </product>
        <product>
            ...
        </product>
    </products>
    <state-of-transaction>NY</state-of-transaction>
    <reconciliation-id>54874</reconciliation-id>
    <amount_detail>
        <amount>49.95</amount>
        <shipping>5.95</shipping>
        <handling>2.00</handling>
        <shippingHandling>7.95</shippingHandling>
        <tax>8.52</tax>
    </amount_detail>
    <shipping_detail>
        <shipment>
            <products_to_ship_here qty=2>
                <product>
                    <product-id>1234</product-id>
                    <product-descrp>Sony DVD Player</product-descrp>
                </product>
                <product>
                    <product-id>5478</product-id>
                    <product-descrip>14-inch Tablet PC</product-descrip>
                </product>
            </products_to_ship_here>
            <addressLine1>500 Main St.</addressLine1>
            <addressLine2>Apt 2A</addressLine2>
            <addressLine3></addressLine3>
            <city>Anytown</city>
            <state>FL</state>
            <postalCode>45784</postalCode>
            <stateProvinceCode>12</stateProvinceCode>
        </shippment>
        <shippment>
            ...
        </shippment>
    </shipping_detail>
    <payment_detail>
        <type>credit_card</type>
        <brand>VISA</brand>
        <pan4>7645</pan4>
        <bin6>547645</bin6>
        <expiration_month>05</expiration_month>
        <expiration_year>2020</expiration_year>
        <avs_response_code>300 - Approved</avs_response_code>
        <psp_ref_id>54874</psp_ref_id>
    </payment_detail>
    <risk_detail>
        <risk_level>Medium</risk_level>
        <risk_advice>
            <advice>Verify signature</advice>
            <advice>Collect drivers license number</advice>
        </risk_advice>
    </risk_detail>
    <partial_billing_details>
        <cardholder_name>John Consumer</cardholder_name>
        <billing_city>Anytown</billing_city>
        <billing_state>FL</billing_state>
        <billing_phone>7184587452</billing_phone>
    </partial_billing_details>
    <full_billing_details>
        <cardholder_name>John Consumer</cardholder_name>
        <billing_addr1>500 Main St.</billing_addr1>
        <billing_addr2>Apt 2A</billing_addr2>
        <billing_city>Anytown</billing_city>
        <billing_state>FL</billing_state>
        <billing_phone>7184587452</billing_phone>
    </full_billing_details>
</transaction_detail_response>
```

In one embodiment, the seller server 503 may then determine that additional transaction options are needed, e.g., 596. Additional transaction options may be additional shipping options such as express shipping or bulk-rate, the use of a pre-paid card for a partial or full payment, additional shipping detail such as an apartment number, and/or the like. If no additional transaction options are needed, the logic flow may continue with respect to FIG. 5b.

If additional transaction options are needed, e.g., 596, then a request from the seller server may be sent to the customer client 502 to request the additional options. An example additional options request 597, substantially in the form of an HTTP(S) POST message including XML-formatted data, is provided below:

```
POST /request.php HTTP/1.1
Host: www.server.com
Content-Type: Application/XML
Content-Length: 667
<?XML version = "1.0" encoding = "UTF-8"?>
<additional_options_request>
    <timestamp>2020-12-12 15:22:43</timestamp>
    <session_id>1e987543578643356</session_id>
    <options_requested>
        <option required=true>
            <id>shipping_options</id>
            <type>shipping</type>
            <values>
                <option>Express Shipping</option>
                <option>Flat Rate Shipping</option>
                <option>Ground</option>
            </values>
            <validation_code>
                <!--inline code returned, e.g., js, for validation -->
                <script>
                    var shipping = null;
                    if (document.popup.shipping == null)
                        alert("Please input shipping");
                    else shipping = document.popup.shipping;
                </script>
            </validation_code>
        </option>
        <option required=false>
            <id>gift_wrapping</id>
            <type>up_sell</type>
            <values>
```

```
          <option>Yes</option>
          <option>No</option>
        </values>
      </option>
      <option>
        ...
      </option>
    </options_requested>
  </additional_options_request>
```

The customer client 502 may then receive the additional options request and present the options to the user for input, e.g., 598. For example, the customer client 502 may display a "pop up" to the user indicating that additional options are required or optional for their order and request the appropriate input. In one embodiment, the additional options request 597 may contain inline logic such as JavaScript or the like that will be executed by the customer client. In doing so, the seller server may collect very complex input from the user without a page reload. If additional options are needed, e.g., 599a, the process outlined above may repeat. If no additional options are required, the seller server 503 may transmit an options completion message to DWG server 504, e.g., 599b, indicating that all additional options have been collected. In one embodiment, no message is sent to the DWG server. The DWG server may then, in one embodiment, note that the additional options have been received. In one example, the DWG server 504 may receive the options for storage or later retrieval, e.g., 599c. The logic flow may then continue with respect to FIG. 5b.

Continuing the logic flow with respect to FIG. 5b, the seller server(s) may send a payment successful message at 582 for display at the client device at 588.

As discussed before, the DWG platform supports notifications and callbacks. One way of receiving notifications is via JavaScript implemented callback functions. In some implementations, callback functions are optional for setting up and running the DWG. Callback functions facilitate customization of the payment experience by collecting relevant data and/or make the experience more powerful using a JavaScript event handler function. Using the data returned from the DWG platform, a developer may code the JavaScript event handler in a page to read any data returned by the callback and display it, log it, or take an action based on it. Additionally, developers may present a customized action such as, for example, an offer to a user if the user buy a product now. This type of callback uses a front end push mechanism. Example returned event types that may be handled with the callback functions are provided below:

| Debit Event Type | Description |
| --- | --- |
| debit.init | Always fires. For example, every time a call is made, there is a debit API in the background. The JSON object returns the call id, a transaction id, user token, and/or user id. |
| debit.success | Fires when the amount was successfully debited from the user's account. In other words, the payment was made. |
| debit.cancel | Fires when the Cancel button is clicked in the lightbox. |
| debit.fail | Fires when the payment fails. |

An example code portion including a developer created callback function called handleVmeEvents is shown below. The callback function is triggered in the buy button tag using the callback parameter. The function name is created by the developer, with the only requirement being that it match the value of the callback parameter in the V.me buy button tag.

```
<html>
<head>
<script type="text/javascript">
handleVmeEvents = function(eventType,data){
  var MerchantTrans = data.merchTrans;
  if (eventType == "debit.success"){
    alert ( msg );
    mywindow = window.open
("./checkyourorder.php?merchTrans=" + MerchantTrans, "Check your
Order ID","width=400,height=300");
    mywindow.moveTo(300, 300);
  }
}
</script>
</head>
<body>
<div id="v-root"></div>
<v:buy apikey = "CG6KBNNKJ5ZSSJC5XTEX"
  token = "eeeeb512b710d0fde173eff8b411ec01"
  amount = "100"
  currency = "USD"
  product-id = "sku29995"
  product-desc = "10 Items, sku: 29995"
  callback = "handleVmeEvents">
</v:buy>
```

The DWG platform may also support back end push notifications in some embodiments. This may be a mandatory server-to-server communication that sends notifications regarding payment events. The Postback URL for this exchange may be configured during the seller on-boarding process. Back-end notifications are automatically sent from DWG back-end servers to the seller's back-end servers when the seller's customer makes a payment using the v:buy button tag. To confirm the communication, the DWG server(s) expects an acknowledgement back from the seller's server. If the notification is not received, there is an exponentially increasing time between a decreasing number of retries, and eventually it is abandoned. The seller may use the developer console to specify the following configuration parameters that the DWG servers may use to send back-end notifications to the seller's servers:

| Parameter | Description |
| --- | --- |
| Postback URL | Back-end notifications are sent to the URL specified by the seller. V.me may not send back-end notifications if the seller has not specified a back-end URL. |
| Postback Method | POST or GET |
| Postback Contenttype | (Only if Postback Method is POST) JSON or XML |

An example back-end notification message sent from the DWG back-end server to a seller's back-end server using the POST method in JSON format is provided below.

```
{ "apikey" : "JZ5K6DNHY2JEUSBUE3Y8",
  "token" : "aDsL5kJfh8kyWei8UrYk0cmNbatQldy",
  "userid" : "testuser",
  "callId" : "101830367",
  "type" : "DEBIT",
  "status" : "200",
  "state" : "PROCESSED",
  "product-id" : "sku28756",
  "productDesc" : "Item",
  "amount" : "1000",
  "currency" : "USD"
```

-continued

```
    "merchTrans" : "129446-832362-389",
    "signature" : "acTf73f590425Bc8913P6a7b9dIb4c26",
}
```

As discussed with respect to FIG. 5b, example values of the "state" field may include "processed," "declined," or "insufficient" based on the type of activity. In some implementations, the value of the signature key in the notification message above may be the MD5 hash of the ordered concatenated string of the shared secret key and values of certain keys in the message as illustrated by the following pseudocode:

```
signature = md5(shared secret key + userid + amount + currency +
  callId + merchTrans + product-id)
```

In some implementations, the responsibility to recreate the notification message's signature and compare it to the signature in the notification message that was sent from the DWG server(s) may reside with the seller. If the signatures are not an exact match, the seller may need to contact DWG server(s)/contact immediately to determine the reason for the mismatch.

An example back-end notification message sent from the DWG back-end servers to a seller's back-end servers using the POST method in XML format is shown below.

```
<notification-payload>
    <apikey>JZ5K6DNHY2JEUSBUE3Y8</apikey>
    <token>aDsL5kJfh8kyWei8UrYk0cmNbatQldy</token>
    <userid>testuser</userid>
    <call-id>101830367</call-id>
    <type>DEBIT</type>
    <status>200</status>
    <state>PROCESSED</state>
    <product-id>sku28756</product-id>
    <product-desc>Item</product-desc>
    <amount>1000</amount>
    <currency>USD</currency>
    <merch-trans>129446-832362-389</merch-trans>
    <signature>acTf73f590425Bc8913P6a7b9dIb4c26</signature>
</notification-payload>
```

An example back-end notification message sent from the DWG back-end servers to a seller's back-end servers using a non-browser based GET method is shown below.

```
apikey=JZ5K6DNHY2JEUSBUE3Y8&token=aDsL5kJfh8kyWei8UrY
k0cmNbatQldy&userid=testuser&callid=101830367&type=DEBIT
&status=200&state=PROCESSED&product-
id=sku28756&productdesc=Item&amount=1000&currency=USD&
merchtrans=129446-832362-389&signature=
acTf73f590425Bc8913P6a7b9dIb4c26
```

In some implementations, the notifications that are pushed from DWG server(s) to the seller can be pulled at will by the seller from the same API used by DWG server(s). The pull at will facility may allow the developer the freedom to choose when to view information on a transaction. The DWG server(s) may automatically call the getStatus API for debit events when users purchase something using the buy button. In some implementations, a GET request method for making the call may follow the following syntax:

```
<UltimatePayServerURL>wallet/api/getStatus?callid={callid}&callno
={callno}&apikey={apikey}&token>={user token}&userid={User id}
```

An example request using the syntax above is shown below.

```
http://server1.sitename.com/wallet/api/getStatus?callid=100006&callno=
1&apikey=1&token=u:c6a5941420cf4cc12486abe8e09a8299&userid
=JohnDoe
```

The DWG server(s) may then send this data to sellers via a POST message in XML format. An exemplary POST message substantially in XML format is shown below.

```
<?xml version="1.0" encoding="UTF-8"?>
<activity>
    <apikey>ksdlkjdf7asdkk3dADT9I8jj5</apikey>
    <token>al3kjdfdkf844WNlkjadfl7kjf939038aUkljd</token>
    <userid>JohnDoe</userid>
    <call-id>3</call-id>
    <type>DEBIT</type>
    <status>200</status>
    <state>PROCESSED</state>
    <product-id>sku744932</product-id>
    <product-desc>Item</product-desc>
    <merch-trans>567456-456456-544</merch-trans>
    <signature>1dec14a5c5c417f69cbd3d30a474519c</signature>
    <transaction>
        <amount>50</amount>
        <currency>USD</currency>
    </transaction>
</activity>
```

Sellers may then parse these messages and handle message data. In some other implementations, sellers may proactively call the getStatus API in case the purchase data does not reach them for some reason.

An example code illustrating various tags, including root tag, initialize tag, buy button tag, JavaScript SDK tag and callback function implemented in JavaScript is shown below.

```
<html>
<head>
<script type="text/javascript">
handleVmeEvents = function(eventType,data) {
    var MerchantTrans = data.merchTrans;
    var ProductID = data.product-id;
    if (eventType == "payment.success") {
        var msg = "Payment Succeeded " + ProductID + "Order id "
+ MerchantTrans; alert (msg) ; }
}
</script>
</head>
<body>
<div id="v-root"></div>
<v:init
    apikey = "RGDJIXJW3U63WTCX3PS0"
    token = "98fef8ac38289318a7a4cb661f9fa0d1"
    userId = "JohnDoe"
    callback = "handleVmeEvents">
</v:init>
<h3> Welcome to Bill's Jewelries Site! Purchase content
here!</h3>
<table width="415" border="1" width="50" height="50">
<tr><td>Order ID: 1234 , 10 Items, SKU: 29995</td>
<td style=text-align:right>
<b style=font-size:2em>10 Items</b>
<v:buy
    apikey = "CG6KBNNKJ5ZSSJC5XTEX"
    token = "eeeeb512b710d0fde173eff8b411ec01"
```

-continued

```
       amount = "100"
       currency = "USD"
       product-id = "sku29995"
       product-desc = "Item, sku: 29995"
       callback = "handleVmeEvents">
     </v:buy>
     </td></tr>
     <br><br>
     <script type="text/javascript" src="http://sandbox-
static.v.me/js/1/v-widgets.js">
     </script>
     </body>
     </html>
```

Figure 6A:
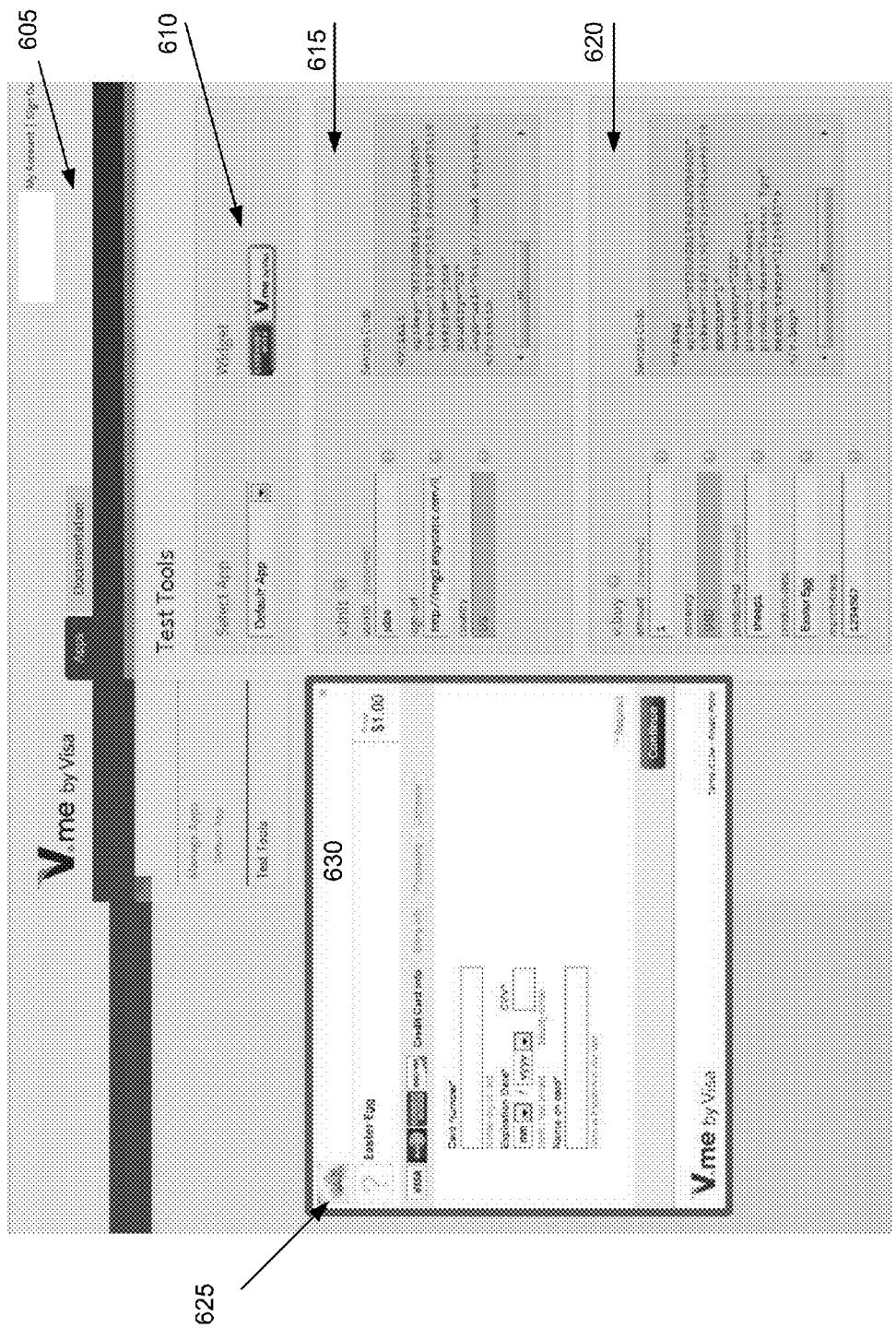
FIGS. 6a-c show screen shots illustrating example widget customization using test tools in some embodiments of the DWG.
Figure 6B:
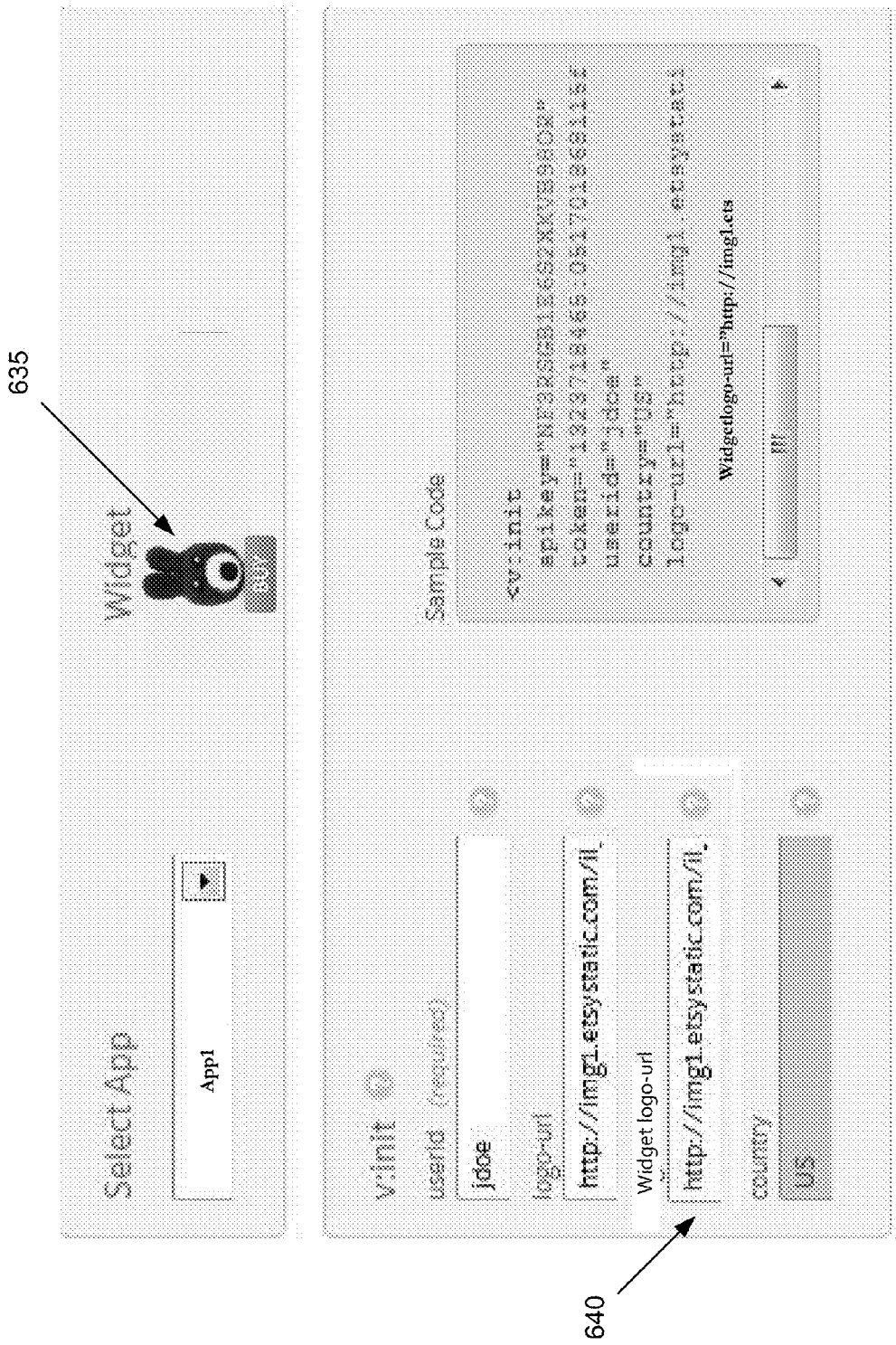
Figure 6C:

FIGS. 6a-c show screen shots illustrating example widgets generated via a test tool in some embodiments of the DWG. An example test tool web page 605 is shown in FIG. 6a. The test tool web page includes a series of fields for selecting an application and entering values for v:init tag 615 and v:buy tag 620. Next to the fields for each tag are corresponding sample code snippets generated on the fly based on the user provided inputs in the fields. The buy widget 610, in this example, may be a default widget that is not customized. When a user clicks on the buy widget, a lightbox 630 is displayed. The lightbox 630 is customized based on user inputs. For example, the image 625 on the lightbox corresponds to the image in the logo-url specified in the v:init tag 615. Similarly, the product description "easter egg" corresponds to the product description in the product-desc field of the v:buy tag 620.

In some embodiments, the seller may have the option to customize the widget. For example, FIG. 6b shows an example App1 where, a widget logo-url 640 is specified. The corresponding code then dynamically generates a widget 635 having the image specified by the widget logo-url 640. As another example, the widget 645 shown in FIG. 6c is dynamically generated and customized based on the product-id code in the v:buy tag. Information such as text (e.g., "buy" or "Get it"), shape and/or color may also be specified in the various tags to dynamically generate customized or personalized buy widgets.

FIGS. 7a-d show example user interfaces of a widget code generator in one embodiment of the DWG. An example user interface showing a widget code generator with integrated testing is show in FIG. 7a. In one embodiment, code is provided by the widget generator for copy/paste into a seller's web page code (e.g., HTML, PHP, and/or the like). Some of the code, e.g., 701, is provided for pasting near the "body" tags within the seller's site code and may not vary with respect to the other options of the widget code generator. In one embodiment, the options selected in the widget code generator will cause the v:init code, e.g., 701, and/or the sample code to automatically change when you update widget parameters using the widget controls, e.g., 702-707 and/or the like.

In one embodiment, a seller may enter an amount to be charged for an item, e.g., 702, a currency, e.g., 703, and/or a product identifier, e.g., 704. In some embodiments, a merchant transaction code (e.g., an order number, customer code, transaction identifier, seller identifier, and/or the like) may be entered, e.g., 705. Options for whether the widget should collect shipping, e.g., 706, and/or when a transaction should be processed, e.g., 707, may also be collected. In one embodiment, some of the fields may be pre-populated based on a seller's profile, previous use of the code generator, selling history, and/or the like.

In one embodiment, the options entered into the widget may be saved for later use, e.g., 710. In doing so, a seller may quickly generate new widget code for rapid integration into their web site code. In some embodiments, the skin of the widget that the provided code will generate may be customized through the code generator, e.g., 708. For example, a seller may click button 708 to input options. As a result, in one embodiment, a custom widget skin may be made available to the seller and the widget code may be updated to note the widget skin to display, e.g., 709. In another embodiment, the widget skin customizations may be stored on the DWG server and therefore not affect the displayed code, e.g., 709. Further detail with respect to widget skin customization can be found herein and particularly with respect to FIG. 7b. In one embodiment, the user may be given an option within the widget generator to generate numerous widgets in bulk, e.g., 711. Further detail with respect to bulk widget generation can be found herein and particularly with respect to FIG. 7c.

FIG. 7b is an example user interface depicting widget skin customization in one embodiment of the DWG. In one embodiment, a pop-up may be presented to the seller after the seller indicates that they wish to customize the widget skin. For example, a seller may click a button, e.g., 708, and be presented with a pop-up widget skin customization interface, e.g., 712. In one embodiment, the seller may customize the background color of the widget to, for example, better match the background of the seller's site, e.g., 713. The seller may also, in one embodiment, add a logo file to the widget by providing a URL to a logo file, e.g., 714. In another embodiment, the user may upload the logo directly to the DWG server from the interface 712 by way of a file upload control (e.g., HTML inline file upload, Flash file upload, and/or the like).

In one embodiment, the seller may check options to add badges to the widget, e.g., 716. A badge is a textual or visual enhancement that is added near, on top of, overlapping the main widget body, and/or the like. A badge may be used to indicate that a seller has additional capabilities, accepts certain payment types, allows the consumer to split a bill with a friend, is privacy enhanced, offers credit, and/or the like. In one embodiment, the preview of the widget may be updated in real-time to show the badge(s) that a seller has selected. Additionally, in one embodiment, other options may influence the rendering of the badge with the widget. For example, a widget background color, e.g., 713, may also be applied to a widget badge, e.g., 716.

In one embodiment, the seller may specify additional run-time widget options. These options will cause the code generator to inject additional code into the generated widget code that will enable additional widget features. For example, in one embodiment, the widget code may be modified to allow the calculation of shipping/handling and/or tax, e.g., 716a. In another embodiment, the seller may select an option to have the widget prompt the user for a quantity amount, e.g., 716b. Optionally, the user may also specify a minimum and maximum amount, which will be validated by the widget prior to or after launching the lightbox. Other fields may also be dynamically loaded into the widget. In one embodiment, shipping information may be already stored in a consumer's v.me account and the seller may desire to have the dynamically generated widget display an address drop down, e.g., 716c. In still another embodiment, address information may be stored on a third-party server, such as a seller's server. A seller may provide access to their or another server for the purpose of retrieving a consumer's address or other information at the time of widget rendering. In one embodiment, the preview widget, e.g., 716d, may additionally display a quantity field when a seller indicates that a quantity should be displayed. Additionally, a total transaction cost may be calculated automatically based on the quantity selected, e.g., 716e. In some embodiments, the widget's calculation of total cost may be modified by the address information selected within the widget, such address information being optionally automatically loaded from a virtual wallet (e.g., v.me and/or the like) or third party server via a dynamic link, e.g., 716c, the quantity of item selected, tax costs, shipping costs, VAT costs, price changes, real-time commodity prices, and/or the like.

In one embodiment, as the seller selects options within the widget skin customization screen, e.g., 712, a preview of the widget as it would appear on the seller's commerce site may appear within the interface, e.g., 716d. In doing so, the seller may see in real-time the effect of their widget customization options and may make both design and content decisions that would provide an optimal user experience. Additionally, in one embodiment, the preview widget may be live and capable of performing a transaction.

FIG. 7c is an example user interface depicting bulk widget generation in one embodiment of the DWG. In one embodiment, a pop-up may be presented to the seller after the seller indicates that they wish to bulk generate widgets. For example, a seller may click a button, e.g., 711, and be presented with a pop-up bulk widget generation interface, e.g., 717. In one embodiment, a seller may upload a file, e.g., 718, that contains data records to be used in bulk widget generation. Example file formats suitable for this purpose are Excel (.xls, and/or the like), Access (.dbf, and/or the like), or a flat file (e.g., comma-separated, tab-separated, and/or the like). Once uploaded, e.g., 719, fields may be extracted from the file (such as by using COM integration within or in conjunction with MS Excel, flat-file reading, and/or the like), e.g., 720. Fields required for widget generation, e.g., 720, may be displayed to the seller along with an option to choose a field from the uploaded file that matches the field. The names of the required fields and the selected fields need not match. In one embodiment, a default override value option, e.g., 721, may be provided to the seller. By inputting a value in the default override, the value of the field in widget generation will be dictated by the default field and not by a value in the uploaded file. In one embodiment, the user may specify a null value as a default override, e.g., 722. In another embodiment, only valid values for a field may be presented to the user as a default override, e.g., 724. Upon filling out all of the required information, the user may then indicate that they wish to bulk generate a widget code snippet for all of the entries in the uploaded data file, e.g., 725.

In one embodiment, the DWG server will receive the bulk widget generation options and will proceed to create the widget code as described herein. Each widget code may be stored in an Excel, database, or other suitable file. In one embodiment, the bulk generated widget code may be automatically uploaded to a seller's web site server. For example, the seller may designate a template file on their server which has a placeholder suitable for replacement by the bulk widget generator. For example, the template may contain code such as:

```
<! -- BULK WIDGET TEMPLATE SNIP START -->
BULK_WIDGET_REPLACEMENT ($PRODUCT_ID)
<! -- BULK WIDGET TEMPLATE SNAP END -->
```

In one embodiment, the bulk widget generation, e.g., 725, may then copy the template file to another location on the seller's server and replace the appropriate section of the template file with the generated widget code. In order to facilitate this operation, the seller may provide the DWG access to their server, such as by providing SFTP credentials, a shared key, and/or the like.

FIG. 7d is an example user interface depicting a widget code generator with dynamic content retrieval, in one embodiment of the DWG. In some embodiments of the DWG, sellers may desire to integrate widget code into their web sites that allows one or more of the widget option values to vary and/or be changed at the time of widget generation. In one embodiment, the option may vary within a range. For example, a seller may desire to generate a widget that automatically updates the price for an item by polling a pricing database. Additionally, instead of being required to re-generate widget code (including a shs256 hashed token) every time an item's price changes, it may be more advantageous for the seller to specify a range of sale prices within which the widget should still accept the transaction. In one embodiment, a maximum amount, e.g., 726, and a minimum amount, e.g., 727) may be specified. A dynamic link, e.g., 728, may also be specified by the seller. When polled, the link may return the current price of an item, such price optionally being within the range specified above. In so doing, the widget generator may generate a token that is not tied to a single price of an item, but rather is suitable for use with items of varying prices. Further detail regarding the generation of a token using a range of item cost amounts is provided with respect to FIG. 8.

FIG. 8a is an example logic flow depicting a widget code generator with dynamic content retrieval, e.g., DCR component 8000, in one embodiment of the DWG. In one embodiment, seller 801 inputs the widget code generator parameters (e.g., currency, product id, merchant transaction value, collect shipping option, and/or the like). In one example, the widget code generator parameters contain a minimum amount and a maximum amount within which the item's cost may vary, e.g., 804. In other embodiments, the variable portion of the widget code parameters may instead be the product identifier, merchant transaction value, and/or the like.

In one embodiment, the seller client 802 may then send a request for widget code generation to the DWG server 803, e.g., 805. An example widget code generation request 805, substantially in the form of an HTTP(S) POST message including XML-formatted data, is provided below:

```
POST /widget_code_request.php HTTP/1.1
Host: www.server.com
Content-Type: Application/XML
Content-Length: 667
<?XML version = "1.0" encoding = "UTF-8"?>
<widget_code_generation_request>
    <timestamp>2020-12-12 15:22:43</timestamp>
    <api_key>LAWQDLK</api_key>
    <max_amount>110.99</max_amount>
    <min_amount>95.99</min_amount>
    <product_id>CU8765</product_id>
    <merch_trans>987545</merch_trans>
    <collect_shipping value=true />
    <process_on>capture</process _on>
    <dynamic_data field="amount">
        <dyn_link>https://merc-serve/prod/?[productid]</dyn_link>
        <substitute value="product_id">[productid]</substitute>
        <request_method>GET</request_method>
```

```
                <return_type>JSON</return_type>
                <return_variable>price</return_variable>
            </dynamic_data>
        </widget_code_generation_request>
```

The server may then extract the widget generator parameters, e.g., 806, 23 and determine if a dynamic cost amount has been provided, e.g., 807. In one embodiment, the DWG server 803 can determine if a dynamic cost amount has been specified by the presence of a minimum amount and maximum amount in the request for widget code generation, e.g., 805 and/or the extracted values, e.g., 806. In one embodiment, the DWG server then calculates a difference or range between the minimum amount and maximum amount, e.g., 808. Then a floor value may be looked up in a dynamic cost database, e.g., 809. An example listing, substantially in the form of PHP/SQL commands, for querying a dynamic database for a floor value is provided below:

```
<?PHP
header ('Content-Type: text/plain') ;
mysql_connect ("locaohost", $DBserver, $password) ; // access
database server
mysql_select_db ("dynamic_cost.sql") ; // select database table to search
//create query for token arbitrators
$query = "SELECT floor_value FROM dynamic_cost WHERE
minimum_amount >
$min_amount AND maximum_amount - minimum_amount < $range AND
permissions LIKE '%' $user_permissions";
$result = mysql_query ($query) ; // perform the search query
mysql_close ("dynamic_cost.sql") ; // close database access
?>
```

In one embodiment, the floor value is a value that is based on the minimum amount and the range between the minimum amount and maximum amount. In another embodiment, the floor value is based on only the range, only the maximum value, only the minimum value, and/or the like. In still other embodiments, the floor value is specified by a DWG server administrator based on business risk tolerance (e.g., the tolerance of the issuer for risk, the tolerance of the seller for risk, the size of the transaction, the history of the buyer, and/or the like). In one example, the determined floor value is then set equal to the amount, e.g., 810.

In one embodiment, a token is generated that represents a unique combination of widget parameters. As described herein, one or more of the unique widget parameters (e.g., amount, and/or the like) may be representative of a range of acceptable values, one value, and/or the like. In one embodiment, a token is generated using an SHA256 hashing algorithm that hashes the string combination of a shared secret key, the amount calculated above or provided by the seller, the currency, a merchant transaction identifier and a product identifier, e.g., 811. In other embodiments, the hash is generated using MD5, Whirlpool, Gost, Haval, and/or the like. An example hash command suitable for token generation, e.g., 811, substantially in the form of PHP is provided below:

```
$token = " ";
$token = hash ('sha256', $shared_secret_key . $amount . $currency.
$merch_trans . $product_id) ;
```

In one embodiment, the generated token will then be placed in a widget code template, and other values in the template will be populated based on user inputs, values looked up, and/or the like, e.g., 812. A widget code template is a widget code shell that may contain placeholders for the insertion of specific widget customization parameters. The widget code and/or the widget code template may then be further customized with respect to FIG. 8*b*.

FIG. 8*b* is an example logic flow of a widget code generator with dynamic content retrieval, in one embodiment of the DWG. In one embodiment, the DWG will determine if the seller has selected that the widget should load shipping information for a consumer from the v.me virtual wallet (see, e.g., FIG. 7*b*, 716*c*), e.g., 850. If the seller has chosen to have the widget load v.me shipping information dynamically, then additional code to dynamically load the shipping information into the widget at the time of rendering may be appended and/or inserted into the generated widget code, e.g., 851. Example code, substantially in the form of JavaScript/jQuery, suitable for injection into the widget code for dynamic address retrieval is:

```
//wait until DOM has loaded to trigger dynamic address loading
//then load up the address information from remote server (v.me, etc.)
//and build a SELECT with content
<script language="JavaScript">
jQuery(document).ready (function ($) {
    $.get (
        'https://www.v.me/' ,
        {doing: "get_shipping_addresses", seller_ id: "1254874", version:
5.1} ,
        function (response) {
            //injection code begin
            inj_code = "<select name=shipping>" ;
            //for each returned address, create a dropdown menu item
            for (i=0; i<response.length; i++) {
                inj_code = inj_code + "<option>" + response[i] + "</option>" ;
            }
            //injection code end
            inj_code = inj_code + "</select>" ;
        } ,
        "json"
    ) ;
} ) ;
</script>
```

In one embodiment, shipping information may be loaded from an external server, such as a third-party server, e.g., 852. In some embodiments, the widget code generator may then require credential information (such as a username/password, shared key, fingerprint authentication, and/or the like) for the third-party server the seller has access to and may request that the seller client 802 solicit this information from the seller, e.g., 853.

In one embodiment, the seller client 802 may parse the credential request and display a prompt to the seller 801 for the credential information for the third-party shipping information server, e.g., 854. The seller may then input the information directly into the widget code generator, e.g., 855, or otherwise upload or store the information in a location accessible by the DWG server 803. The seller client 802 may then transmit the credentials to the DWG server, e.g., 856. In one embodiment, the DWG server will then store the credentials in a credentials database in a secure format, such as by one-way cryptographically hashing the credential password, e.g., 857. The DWG server may then append third-party server shipping lookup code to the generated widget code, e.g., 858. Example code, substantially in the form of JavaScript/jQuery, suitable for injection into the widget code for third-party address retrieval is:

```
//wait until DOM has loaded to trigger dynamic address loading
//then load up the address information from remote server (v.me, etc.)
//and build a SELECT with content
<script language="JavaScript">
jQuery(document).ready (function ($) {
    $.get (
        'https://www.third-party.com/?credential=87HASH654',
        {doing: "get_shipping_addresses",
            user_name: "shippingAccessUserName",
            password: "timeLimitedPassword"},
        function (response) {
            //injection code begin
            inj_code = "<select name=shipping>";
            //for each returned address, create a dropdown menu item
            for (i=0; i<response.length; i++) {
                inj_code = inj_code + "<option>" + response[i] + "</op-
tion>";
            }
            //injection code end
            inj_code = inj_code + "</select>";
        },
        "json"
    ) ;
} ) ;
< /script>
```

In one embodiment, additional dynamic data may be loaded into the widget generator generated code, e.g. 859 using code substantially similar to the appended code described herein. For example, default quantity information may be solicited from a costing server based on a consumer's past buying behavior and dynamic retrieval of same incorporated into the dynamically generated widget code. In one embodiment, the additional injected widget generation code may load items from a user's "wish list" at a merchant, facilitating low friction commerce opportunities via a seller based widget, e.g. 860.

Returning to FIG. 8*a*, the widget code may then be set by the DWG server 803 to the seller client 802, e.g., 813. An example widget code generation response, e.g. 813, substantially in the form of an HTTP(S) POST message including XML-formatted data, is provided below:

```
POST /widget_code_response.php HTTP/1.1
Host: www.server.com
Content-Type: Application/XML
Content-Length: 667
<?XML version = "1.0" encoding = "UTF-8"?>
<widget_code_response>
    <timestamp>2020-12-12 15:22:43</timestamp>
    <api_key>LAWQDLK</api_key>
    <code content_type="Javascript / HTML 5.0">
        <v:buy
            apikey = "L3AWQDLKBHYCE2XO5"
            token = "7643245f59a654654"
            dynamic_amount = "https://merch-serve/prod/?[product_id]"
            dynamic_method="POST"
            product-id = "Testproduct1"
            merch-trans = " "
            collect-shipping = "true"
            process = "validate">
        </v:buy>
        <script language="JavaScript">
            jQuery(document).ready (function ($) {
                //dynamic shipping code, e.g., 858
            }
        </script>
    </code>
</widget_code_response>
```

The seller client 802 may receive and display the widget code, e.g., 814. In one embodiment, the seller may then copy and paste the generated widget code from the widget generator into their web site code (e.g., HTML, PHP code, and/or the like), e.g., 815. The seller's web site code containing the generated widget code may then be deployed to the sellers server (e.g., by SFTP upload, using shared keys, using a live WYSIWYG code editor, and/or the like). In one embodiment the widget code generator generation step is performed by the seller's server, seller client 802 (such as dynamically generating the widget code directly using JavaScript, and/or the like), the seller 801 (such as by manually inserting the appropriate widget code and calculating the token), and/or the like.

DWG Controller

Figure 9:
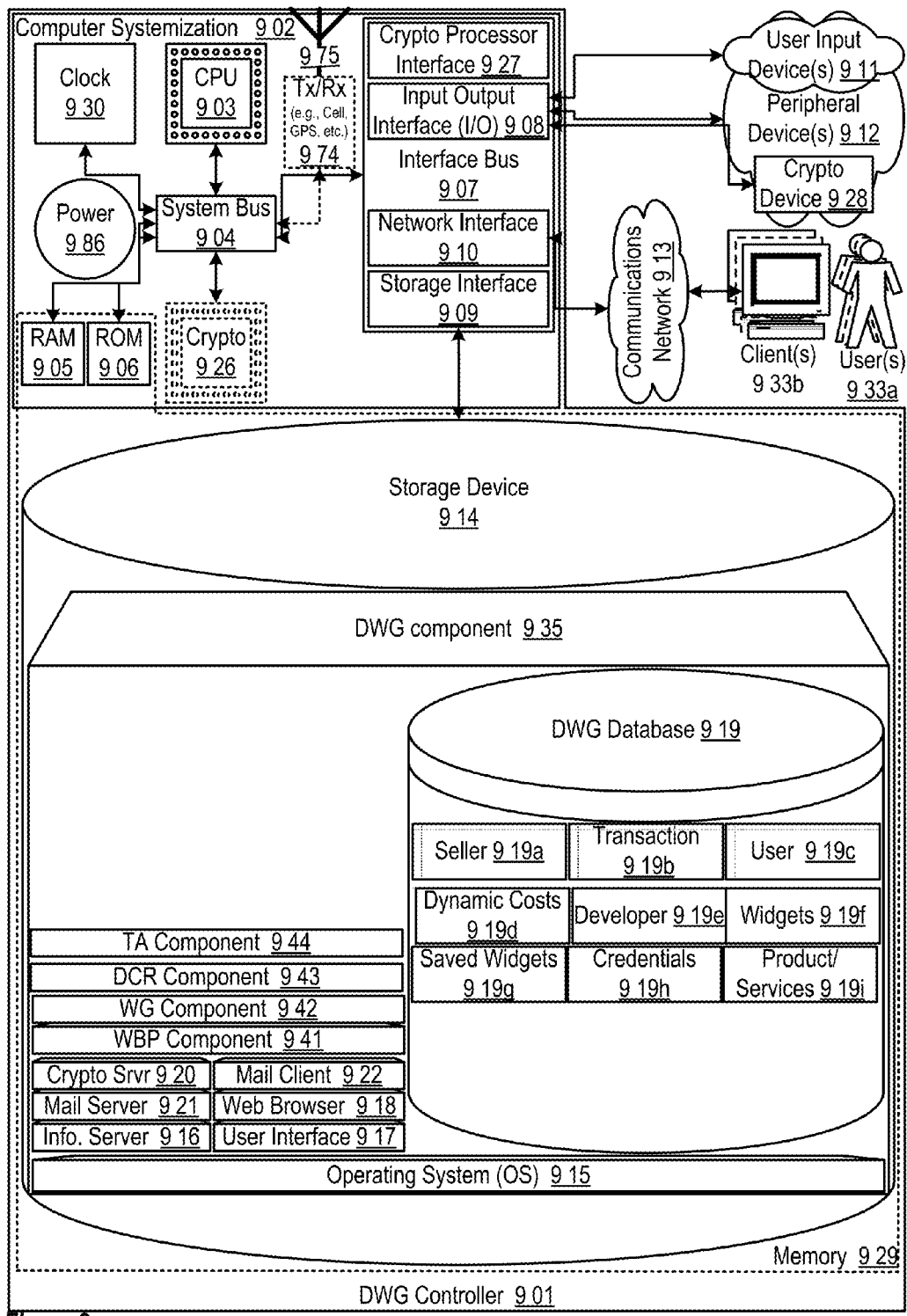
FIG. 9 shows a block diagram illustrating embodiments of a DWG controller.

FIG. 9 shows a block diagram illustrating embodiments of a DWG controller. In this embodiment, the DWG controller 901 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DWG controller 901 may be connected to and/or communicate with entities such as, but not limited to: one or more users from user input devices 911; peripheral devices 912; an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DWG controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeably throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 and/or transceivers (e.g., ICs) 974 may be connected to the system bus. In another embodiment, the cryptographic processor and/or transceivers may be connected as either internal and/or external peripheral devices 912 via the interface bus I/O. In turn, the transceivers may be connected to antenna(s) 975, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DWG controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DWG controller and beyond through various interfaces. Should processing requirements dictate a greater amount speed and/or capacity, distributed processors (e.g., Distributed DWG), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the DWG may be achieved by implementing a microcontroller such as CAST's R8051XC2 microcontroller; Intel's MCS 51 (i.e., 8051 microcontroller); and/or the like. Also, to implement certain features of the DWG, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DWG component collection (distributed or otherwise) and/or features may be implemented via the microprocessor and/or via embedded components; e.g., via ASIC, coprocessor, DSP, FPGA, and/or the like. Alternately, some implementations of the DWG may be implemented with embedded components that are configured and used to achieve a variety of features or signal processing.

Depending on the particular implementation, the embedded components may include software solutions, hardware solutions, and/or some combination of both hardware/software solutions. For example, DWG features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DWG features. A hierarchy of programmable interconnects allow logic blocks to be interconnected as needed by the DWG system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DWG may be developed on regular FPGAs and then migrated into a fixed version that more resembles ASIC implementations. Alternate or coordinating implementations may migrate DWG controller features to a final ASIC instead of or in addition to FPGAs. Depending on the implementation all of the aforementioned embedded components and microprocessors may be considered the "CPU" and/or "processor" for the DWG.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the DWG thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the DWG controller is accessible through remote clients 933b (e.g., computers with web browsers) by users 933a. Network interfaces may employ connection protocols such as, but not limited to: direct connect, Ethernet (thick, thin, twisted pair 0/100/1000 Base T, and/or the like), Token Ring, wireless connection such as IEEE 802.11a-x, and/or the like. Should processing requirements dictate a greater amount speed and/or capacity, distributed network controllers (e.g., Distributed DWG), architectures may similarly be employed to pool, load balance, and/or otherwise increase the communicative bandwidth required by the DWG controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 911 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the DWG controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DWG controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the DWG controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100O, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the DWG controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the DWG component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the DWG controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DWG controller to communicate with other entities through a communications network 913. Various communication protocols may be used by the DWG controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DWG controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DWG database 919, operating systems, other program components, user interfaces, Web browsers, and/or the like.

Access to the DWG database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DWG. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DWG as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DWG enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DWG.

Access to the DWG mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DWG may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DWG component to engage in secure transactions if so desired. The cryptographic component facilitates the secure accessing of resources on the DWG and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DWG Database

The DWG database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DWG database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DWG database is implemented as a data-structure, the use of the DWG database 919 may be integrated into another component such as the DWG component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-i*. A developer/seller table 919*a* includes fields such as, but not limited to: seller_id, seller_name, country, currency, email_address, password, userid, api_key, secret_key, postback_URL, and/or the like. The seller table may support and/or track multiple entity accounts on a DWG. A transaction table 919*b* includes fields such as, but not limited to: product-id, product-desc, merchant-trans, userid, customer-id, amount, currency, dom-id, state, and/or the like. A user table 919*c* user table includes fields such as, but not limited to: user_id, user_name, customer-id, credit_card_number, expiration_date, CVV, address, email, and/or the like. A dynamic costs table 919*d* includes fields such as, but not limited to: dynamic_cost_id, credentials_id, transaction_id, product_id, cost, minimum_cost, maximum_cost, floor_value, ceiling_value, and/or the like. A developer table 919*e* includes fields such as, but not limited to: developer_id, secret_key, api_key, developer_name, seller_id, last_deployed_code_date, saved_widgets. A widgets table 919*f* includes fields such as, but not limited to: widget_id, seller_id, product_id, developer_id, widget_code, last_used_widget, is_saved, and/or the like. A saved widgets table 919*g* includes fields such as, but not limited to: saved_widget_id, widget_id, seller_id, developer_id, widget_last_updated_date, and/or the like. A credentials table 919*h* includes fields such as, but not limited to: credential_id, seller_id, developer_id, user_name, password, crypto_key, web_site_url, request_method, request_response_variable, and/or the like. A product/services table 919*i* includes fields such as, but not limited to: product_id, seller_id, developer_id, product_name, product_description, inventory_quantity, next_inventory_order_date, next_inventory_order_amount, model_number, manufacturer, and/or the like.

In one embodiment, the DWG database may interact with other database systems. For example, employing a distributed database system, queries and data access by search DWG component may treat the combination of the DWG database, an integrated data security layer database as a single database entity.

In one embodiment, user programs may contain various user interface primitives, which may serve to update the DWG. Also, various accounts may require custom database tables depending upon the environments and the types of clients the DWG may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-i*. The DWG may be configured to keep track of various settings, inputs, and parameters via database controllers.

The DWG database may communicate to and/or with other components in a component collection, including itself, and/or facilities of the like. Most frequently, the DWG database communicates with the DWG component, other program components, and/or the like. The database may contain, retain, and provide information regarding other nodes and data.

The DWGs

The DWG component 935 is a stored program component that is executed by a CPU. In one embodiment, the DWG component incorporates any and/or all combinations of the aspects of the DWG that was discussed in the previous figures. As such, the DWG affects accessing, obtaining and the provision of information, services, transactions, and/or the like across various communications networks.

The DWG transforms developer registration information and purchase request inputs via DWG components into user authentication, buy widgets, purchase authorization and notification outputs. In one embodiment, the DWG component 935 takes inputs (e.g., registration information 205, DWG tags and parameters 230, buy widget click 405, payment information 425, and/or the like), and transforms the inputs via various components (e.g., WG component 301/942, WBP component 501/941, DCR component 943, TA component 944) into outputs (e.g., registration request 210, deploy code request 235, lightbox request 410, purchase request 430, and/or the like).

The DWG component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DWG server employs a cryptographic server to encrypt and decrypt communications. The DWG component may communicate to and/or with other components in a component collection, including itself, and/or facilities of the like. Most frequently, the DWG component communicates with the DWG database, operating systems, other program components, and/or the like. The DWG may contain, communicate, generate, obtain, and/or provide program component, system, user, and/or data communications, requests, and/or responses.

Distributed DWGs

The structure and/or operation of any of the DWG node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DWG controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DWG controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain') ;
// set ip address and port to listen to for incoming data
$address = '192.168.0.100' ;
$port = 255;
```

-continued

```
// create a server-side SSL socket, listen for/accept incoming communication
$sock = socket_ create (AF_ INET, SOCK_ STREAM, 0) ;
socket_bind ($sock, $address, $port) or die ('Could not bind to address') ;
socket_listen ($sock) ;
$client = socket_accept ($sock) ;
// read input data from client device in 1024 byte blocks until end of message
do {
  $input = " " ;
  $input = socket_ read ($client, 1024) ;
  $data .= $input ;
} while ($input != " ") ;
// parse data to extract variables
$obj = json_decode ($data, true) ;
// store input data in a database
mysql_connect ("201.408.185.132", $DBserver, $password) ;
// access database server
mysql_select ("CLIENT_DB.SQL") ; // select database to append
mysql_query ("INSERT INTO UserTable (transmission)
VALUES ($data)") ; // add data to UserTable table in a CLIENT database
mysql_close ("CLIENT_DB.SQL") ; // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for DYNAMIC WIDGET GENERATOR APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DWG individual and/or enterprise user, database configuration and/or relational model, data type, data transmission and/or network framework, syntax structure, and/or the like, various embodiments of the DWG, may be implemented that enable a great deal of flexibility and customization. For example, aspects of the DWG may be adapted for offer distribution and analytics. While various embodiments and discussions of the DWG have been directed to widget generation, however, it is to be understood that the embodiments described herein may be readily configured and/or customized for a wide variety of other applications and/or implementations.

What is claimed is:
1. A processor-implemented purchase widget integration code generation method, comprising:
  obtaining, buy a dynamic widget generator server, a plurality of widget customization parameters from a seller server;
  inserting, by a client computing system of the seller server, a plurality of tags in a seller web site hosted on the seller server;
  generating, by the dynamic widget generator server, for each product item listed in the seller web site, a token using the obtained widget customization parameters, as a cryptographic hash of at least two of the obtained widget customization parameters;
  inserting, by the seller server, the obtained plurality of widget customization parameters and the generated token into the widget code template to generate a deployable widget code block;
  providing, by the seller server, the deployable widget code block to a computer network interface accessing the seller web site;
  accessing, by the computer network interface, the seller web site;

loading, by the computer network interface, the deployable widget code block from the seller web site onto the computer network interface;
handling, by the computer network interface using at least one of the plurality of tags, input received by the seller website based on the obtained widget customization parameters; and
authenticating, by the dynamic widget generator server, the seller server for a purchase of a product item based on the token corresponding to the product item.

2. The method of claim 1, further comprising:
receiving from the seller at least one widget skin customization parameter.

3. The method of claim 2, wherein the at least one widget skin customization parameter is a seller logo file.

4. The method of claim 2, wherein the at least one widget skin customization parameter is a widget activation message.

5. The method of claim 2, wherein the at least one widget skin customization parameter is a widget badge.

6. The method of claim 5, wherein the widget badge indicates that the seller has heightened privacy requirements for a transaction.

7. The method of claim 5, wherein the widget badge indicates that a consumer may split the purchase cost with another individual.

8. The method of claim 5, wherein the widget badge indicates that a seller is configured to accept payment by electronic check.

9. The method of claim 1, wherein the deployable widget code block is live and engagable to complete a transaction specified by the widget customization parameters.

10. The method of claim 1, wherein at least one of the widget customization parameters is a dynamic content link.

11. The method of claim 10, wherein the dynamic content link is a dynamic amount representing the cost of a product or service.

12. The method of claim 11, wherein the dynamic amount representing the cost of a product or service includes a minimum amount and a maximum amount.

13. The method of claim 12, additionally comprising a dynamic amount lookup link suitable for obtaining real-time cost amounts.

14. The method of claim 1, additionally comprising injecting dynamic lookup code into the deployable widget code block.

15. The method of claim 14, wherein the dynamic lookup code is code suitable for retrieving shipping address information from a virtual wallet server.

16. The method of claim 14, wherein the dynamic lookup code is code suitable for retrieving shipping address information from a third-party server.

17. The method of claim 16, additionally comprising receiving third-party server access credentials from the seller.

18. The method of claim 1, wherein the deployable widget code block is instantiated and live updatable within a widget constructor responsive to seller's manipulation of parameter varying controls and wherein the deployable widget code block may be used in the seller's web site.

19. A purchase widget integration code generation apparatus, comprising:
a memory;
a processor disposed in communication with said memory, and configured to issue a plurality of processing instructions stored in the memory, wherein the processor issues instructions to:
obtain a plurality of widget customization parameters from a seller server;
insert a plurality of tags in a seller web site hosted on the seller server;
generate, for each product item listed in the seller web site, a token, using the obtained widget customization parameters, as a cryptographic hash of at least two of the obtained widget customization parameters;
insert the obtained plurality of widget customization parameters and the generated token into the widget code template to generate a deployable widget code block; and
provide the deployable widget code block to a computer network interface accessing the seller web site;
access the seller web site;
load the deployable widget code block from the seller web site onto the computer network interface;
handling, using at least one of the plurality of tags, input received by the seller website based on the obtained widget customization parameters; and
authenticate the seller server for a purchase of a product item based on the token corresponding to the product item.

20. The apparatus of claim 19, further comprising instructions to:
receiving from the seller at least one widget skin customization parameter.

21. The apparatus of claim 20, wherein the at least one widget skin customization parameter is a seller logo file.

22. The apparatus of claim 20, wherein the at least one widget skin customization parameter is a widget activation message.

23. The apparatus of claim 20, wherein the at least one widget skin customization parameter is a widget badge.

24. The apparatus of claim 23, wherein the widget badge indicates that the seller has heightened privacy requirements for a transaction.

25. The apparatus of claim 23, wherein the widget badge indicates that a consumer may split the purchase cost with another individual.

26. The apparatus of claim 23, wherein the widget badge indicates that a seller is configured to accept payment by electronic check.

27. The apparatus of claim 19, wherein the deployable widget code block is live and engagable to complete a transaction specified by the widget customization parameters.

28. The apparatus of claim 19, wherein at least one of the widget customization parameters is a dynamic content link.

29. The apparatus of claim 28, wherein the dynamic content link is a dynamic amount representing the cost of a product or service.

30. The apparatus of claim 29, wherein the dynamic amount representing the cost of a product or service includes a minimum amount and a maximum amount.

31. The apparatus of claim 30, additionally comprising a dynamic amount lookup link suitable for obtaining real-time cost amounts.

32. The apparatus of claim 19, additionally comprising instructions to inject dynamic lookup code into the deployable widget code block.

33. The apparatus of claim 32, wherein the dynamic lookup code is code suitable for retrieving shipping address information from a virtual wallet server.

34. The apparatus of claim 32, wherein the dynamic lookup code is code suitable for retrieving shipping address information from a third-party server.

35. The apparatus of claim 34, additionally comprising instructions to receive third-party server access credentials from the seller.

36. The apparatus of claim 19, wherein the deployable widget code block is instantiated and live updatable within a widget constructor responsive to seller's manipulation of parameter varying controls and wherein the deployable widget code block may be used in the seller's web site.

37. A non-transitory medium storing purchase widget integration code generation instructions to:
- obtain, by a dynamic widget generator server, a plurality of widget customization parameters from a seller server;
- insert, by a client computing system of the seller server, a plurality of tags in a seller web site hosted on the seller server;
- generate, by the dynamic widget generator server, for each product item listed in the seller web site, a token, using the obtained widget customization parameters, as a cryptographic hash of at least two of the obtained widget customization parameters;
- insert, by the seller server, the obtained plurality of widget customization parameters and the generated token into the widget code template to generate a deployable widget code block;
- provide the deployable widget code block to a computer network interface accessing the seller web site;
- access, by the computer network interface, the seller web site;
- handle, by the computer network interface using at least one of the plurality of tags, input received by the seller website based on the obtained widget customization parameters; and
- authenticating, by the dynamic widget generator server, the seller server for a purchase of a product item based on the token corresponding to the product item.

38. The medium of claim 37, further comprising instructions to:
- receive from the seller at least one widget skin customization parameter.

39. The medium of claim 38, wherein the at least one widget skin customization parameter is a seller logo file.

40. The medium of claim 38, wherein the at least one widget skin customization parameter is a widget activation message.

41. The medium of claim 38, wherein the at least one widget skin customization parameter is a widget badge.

42. The medium of claim 41, wherein the widget badge indicates that the seller has heightened privacy requirements for a transaction.

43. The medium of claim 41, wherein the widget badge indicates that a consumer may split the purchase cost with another individual.

44. The medium of claim 41, wherein the widget badge indicates that a seller is configured to accept payment by electronic check.

45. The medium of claim 37, wherein the deployable widget code block is live and engagable to complete a transaction specified by the widget customization parameters.

46. The medium of claim 37, wherein at least one of the widget customization parameters is a dynamic content link.

47. The medium of claim 46, wherein the dynamic content link is a dynamic amount representing the cost of a product or service.

48. The medium of claim 47, wherein the dynamic amount representing the cost of a product or service includes a minimum amount and a maximum amount.

49. The medium of claim 48, additionally comprising a dynamic amount lookup link suitable for obtaining real-time cost amounts.

50. The medium of claim 37, additionally comprising instructions to inject dynamic lookup code into the deployable widget code block.

51. The medium of claim 50, wherein the dynamic lookup code is code suitable for retrieving shipping address information from a virtual wallet server.

52. The medium of claim 50, wherein the dynamic lookup code is code suitable for retrieving shipping address information from a third-party server.

53. The medium of claim 52, additionally comprising instructions to receive third-party server access credentials from the seller.

54. The medium of claim 37, wherein the deployable widget code block is instantiated and live updatable within a widget constructor responsive to seller's manipulation of parameter varying controls and wherein the deployable widget code block may be used in the seller's web site.

* * * * *